US010225705B2

(12) United States Patent
Bokestad et al.

(10) Patent No.: US 10,225,705 B2
(45) Date of Patent: Mar. 5, 2019

(54) SYSTEM AND METHOD FOR POSTING CONTENT TO NETWORKS FOR FUTURE ACCESS

(71) Applicants: Olav Bokestad, New York, NY (US); Anna Bokestad, New York, NY (US)

(72) Inventors: Olav Bokestad, New York, NY (US); Anna Bokestad, New York, NY (US)

( * ) Notice: Subject to any disclaimer, the term of this patent is extended or adjusted under 35 U.S.C. 154(b) by 80 days.

(21) Appl. No.: 15/174,901

(22) Filed: Jun. 6, 2016

(65) Prior Publication Data

US 2016/0359956 A1 Dec. 8, 2016

Related U.S. Application Data

(60) Provisional application No. 62/171,922, filed on Jun. 5, 2015.

(51) Int. Cl.

| G06F 15/16 | (2006.01) |
| H04W 4/21 | (2018.01) |
| H04W 4/20 | (2018.01) |
| H04W 12/08 | (2009.01) |

(52) U.S. Cl.
CPC ............ *H04W 4/21* (2018.02); *H04W 4/206* (2013.01); *H04W 12/08* (2013.01)

(58) Field of Classification Search
CPC combination set(s) only.
See application file for complete search history.

(56) References Cited

U.S. PATENT DOCUMENTS

| 9,384,258 | B1* | 7/2016 | Lee-chan | G06F 17/3089 |
| 9,413,710 | B1* | 8/2016 | Saylor | H04L 51/32 |
| 9,413,794 | B1* | 8/2016 | Saylor | H04L 65/4076 |
| 9,715,901 | B1* | 7/2017 | Singh | G11B 27/034 |
| 9,836,619 | B1* | 12/2017 | Goldston | G06F 21/6218 |
| 2007/0271336 | A1* | 11/2007 | Ramaswamy | G06Q 10/107 709/204 |
| 2012/0323647 | A1* | 12/2012 | Klooster | G06Q 30/02 705/14.1 |
| 2013/0046810 | A1* | 2/2013 | Loew | H04L 67/06 709/203 |
| 2013/0054721 | A1* | 2/2013 | Caden | G06Q 50/00 709/206 |
| 2013/0217416 | A1* | 8/2013 | Matthews, III | H04W 4/028 455/456.2 |
| 2013/0227061 | A1* | 8/2013 | Liu | H04L 67/18 709/217 |
| 2013/0268828 | A1* | 10/2013 | Bucchieri | G06Q 50/01 715/205 |

(Continued)

*Primary Examiner* — Shean Tokuta
(74) *Attorney, Agent, or Firm* — Pequignot + Myers; Matthew A. Pequignot

(57) ABSTRACT

Social networks provisioned to allow content to be posted for future access. In some embodiments, methods and systems for creating and defining access to future accessible posts (e.g., containing multimedia content). In certain preferred embodiments, social networks which unlock content for access or viewing by users upon the occurrence of future, but initially temporally undefined, special events (e.g., weddings of unknown dates, birthdays of unborn persons, etc.) In other preferred embodiments, network content access may be defined or granted based, in part, on future proximity to geo-tagged locations.

6 Claims, 30 Drawing Sheets

(56) References Cited

U.S. PATENT DOCUMENTS

| | | | | |
|---|---|---|---|---|
| 2013/0326373 | A1* | 12/2013 | Lisabeth | H04L 51/32 715/753 |
| 2014/0143004 | A1* | 5/2014 | Abhyanker | G06Q 10/087 705/7.19 |
| 2014/0143061 | A1* | 5/2014 | Abhyanker | G06Q 50/01 705/14.58 |
| 2014/0207864 | A1* | 7/2014 | Meena | H04L 67/306 709/204 |
| 2014/0214991 | A1* | 7/2014 | Mansfield | H04L 51/32 709/206 |
| 2014/0337938 | A1* | 11/2014 | Abhyanker | G06F 17/30595 726/5 |
| 2015/0019654 | A1* | 1/2015 | Wheeler | H04L 51/24 709/206 |
| 2015/0088968 | A1* | 3/2015 | Wei | H04L 67/10 709/203 |
| 2016/0191450 | A1* | 6/2016 | Lineberger | H04L 51/32 709/206 |
| 2017/0039528 | A1* | 2/2017 | Becker | G06Q 10/1095 |

* cited by examiner

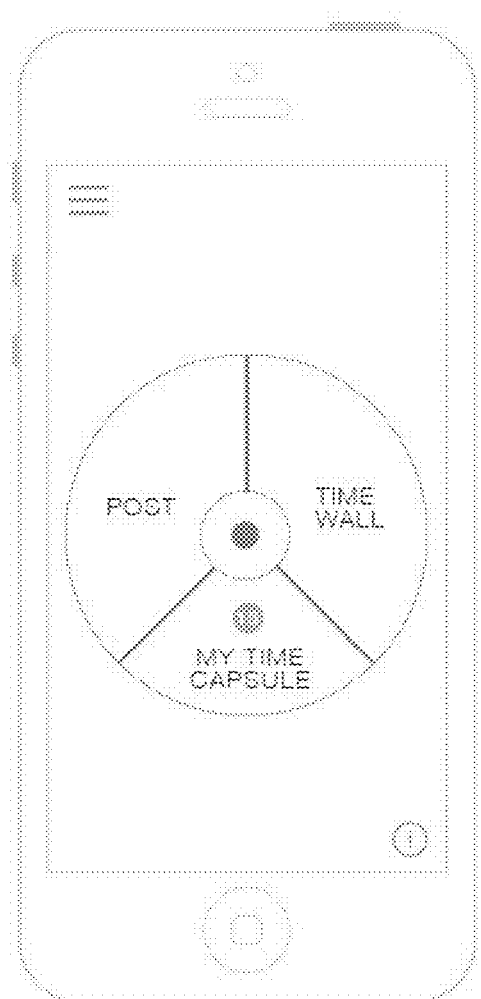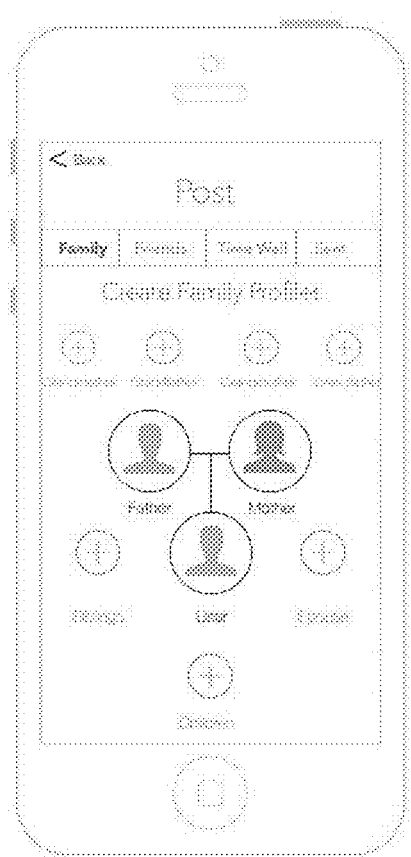
FIG. 1
FIG. 2A

FIG. 6A
FIG. 6B
FIG. 6C
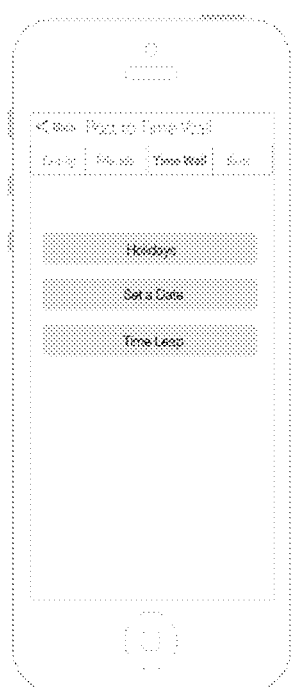
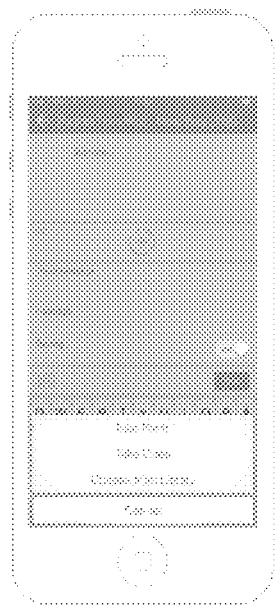

FIG. 12

← PROFILE IMAGE

← PROFILE NAME
   HIDE PROFILE

← PROFILE GENDER

← PROFILE EMAIL

← PROFILE PHONE

← PROFILE BIRTHDAY
   LIVING OR NOT

← WEDDING DATE
   MARRIED OR NOT

← GRADUATION DATE

← PROFILE BIO

← RELATED TO

SELECT TIME LEAP AND CONTINUE TO CREATE AND POST EVENT TO FRIENDS

SYSTEM AND METHOD FOR POSTING CONTENT TO NETWORKS FOR FUTURE ACCESS

RELATED APPLICATION DATA

This application claims priority to U.S. Patent Application No. 62/171,922, filed on Jun. 5, 2015. The entirety of such application is hereby incorporated by reference.

FIELD OF THE INVENTION

The present invention relates to social networks provisioned to allow content to be posted for future access. In some embodiments, this invention relates to methods and systems for creating and defining access to future accessible posts (e.g., containing multimedia content). In certain preferred embodiments, the invention relates to social networks which unlock content for access or viewing by users upon the occurrence of future, but initially temporally undefined, special events (e.g., weddings of unknown dates, birthdays of unborn persons, etc.) In other preferred embodiments, network content access may be defined or granted based, in part, on future proximity to geo-tagged locations.

BACKGROUND OF THE INVENTION

Since the advent of the internet and world wide web, communication amongst individuals with access to computers (or mobile computing devices) and internet connections has evolved dramatically. For example, social and business networks have been developed, which permit communication over the internet, by providing meeting hubs at world wide web "pages" (or websites) which can be accessed and viewed to communicate with friends, family, business associates, and even strangers. This so-called "social networking"—the communication with individuals or groups of individuals using meeting hubs provided by web interfaces or pages—can be done for entertainment, as a substitute for in person or telephone or conventional written communication, or can be used for business purposes (or all of the above). Examples of social networking hubs are Facebook, LinkedIn, MySpace, and Instagram.

On a typical social network website or page, the hosting company provides a graphical user interface ("GUI") which allows communication amongst participants utilizing text or multimedia posts of content or information or messages. Such websites often show associations amongst network participants (e.g., friend or business associate status) and in some cases, as with Facebook, provide individual users with their own personal pages (which can be made private or public, or something in between).

In a conventional social networking interaction, such as often takes place on a website like Facebook, users can post information on their own personal network page or on pages of other users. Such posts can be immediately seen by other users of the network which have access to the page on which the content has been posted. Although such networks exist where content can be posted for immediate viewing, heretofore no network or method or system is believed to exist (or to have existed) which permits messages or content to be posted "to the future", such as for access by unborn individuals or for access upon the occurrence of a future event (e.g., the date of which may not yet have been selected). Moreover, no networks are known which provide access to content in the future, when a user of the network is in proximity to a selected geographical location.

It is, in certain embodiments, a purpose of the herein described inventions to address one or more of the above described drawbacks. It is also a purpose of one or more of the herein described inventions to address other drawbacks (not necessarily disclosed above) and/or other desires for improvements in the art, whether or not currently known, which will become more apparent to the skilled artisan once given the present disclosure.

SUMMARY OF CERTAIN EXAMPLE EMBODIMENTS OF THE INVENTION

Presently there are no systems and/or methods known for posting or hosting messages and content for access in the future and by future generations. The inventions, in certain embodiments, provide and/or enable a new way to share content and information "into the future" whether it is for sharing with already living persons or unborn generations. Certain embodiments can also target such messages (or content) to specific events and locations.

DEFINITIONS

"Unborn person": a person that has either not been conceived or a person that has been conceived but has not yet been born. For example, a profile can be created for a future child that has not yet been conceived, but is expected to be conceived.

"Time": this term is used to indicate a day, or time and day, and is used in the specification in many instances in reference to the occurrence of an access event. This can either be the day the access event occurs, or the day, hour, minute, and second that the event occurs.

"Geo tag": a data notation of the geographic location of an event or point in time. While examples of mechanisms or devices for creating geo tags include Global Positioning System ("GPS") based systems (wherein satellites in space are used), other mechanisms or methods for determining physical or geographical locations (such as, but not limited to, geographical coordinates) are contemplated. For example, the location of a modern mobile telephone handset (such as a smart phone) may be located by triangulation techniques by measuring or analyzing communications of such telephone handsets with cellular transmission towers. In further alternative examples, locations may be determined by communications with wireless networks (e.g., of known location) or by manual input of location information by a telephone handset or laptop or desktop users.

"Multimedia content": content comprised of an integration of multiple forms of media, such as text, graphics, audio, and video (but in some cases only one of such media forms).

SUMMARY OF EXAMPLE EMBODIMENTS

The present invention generally relates, in at least one embodiment, to electronic networks (e.g., social or business networks such as maintained on web pages) which permit users of the network to post future accessible messages which are typically comprised of multimedia content. In some of these embodiments, access to content on a network is initially blocked until the occurrence of a future event. Non-limiting examples of future events include specific event types (e.g., weddings, graduations, etc.) which may have uncertain dates and are, therefore, initially temporally undefined. Although events such as birthdays are normally certain (i.e., for born persons), because this invention contemplates content posts being made for persons that are unborn (as defined elsewhere herein), the birthdate of the unborn person is unknown until birth, and therefore considered as uncertain (temporally) in such case. Of course, some embodiments of this invention also include posting of future accessible messages where the dates are certain (e.g., a birthday of an already born person). In some of the above-described embodiments, a solution (e.g., in the form of a network) is provided which enables users to create user profiles (for persons either alive or unborn, or both) and to post directly into these profiles, with access to such posts being defined by the occurrence of future life events. In the same or alternative embodiments, content posts may be made to open, public time walls to be unlocked upon the occurrence of specific future events or times. In other preferred (but optional) embodiments, network content access may be defined or granted based, in part, on future proximity to geo-tagged locations.

In at least one embodiment of the inventions described and disclosed herein, there is provided a method comprising: providing a network to which a plurality of interactive devices are communicably connected; providing a graphical user interface which is visible to users of the network on viewing screens of the plurality of interactive devices; a content originating user of one of the plurality of interactive devices creating content, comprised of multimedia subject matter, and uploading the content to the network, such that the content upload is visible as a post notification on the network to select viewing users of the interactive devices communicably connected to the network; the content originating user of the one of the plurality of interactive devices, which uploaded the content to the network, also selecting an access event for associating with the content visible as the post notification; the access event being defined in character at a first time X while remaining undefined temporally at the first time x; and wherein the multimedia subject matter comprising the content is inaccessible to the select viewing users of the interactive devices prior to occurrence of the access event; entering temporal data for association with the access event to define the access event temporally, at a second time Y which is subsequent to the first time x; and wherein the multimedia subject matter comprising the content is automatically unlocked for access by the select viewing users of the interactive devices upon occurrence of the access event at a time which corresponds with the temporal data.

In certain other non-limiting embodiments, this invention provides a method comprising:

providing a network to which a plurality of interactive devices are communicably connected; providing a graphical user interface which is visible to users of the network on viewing screens of the plurality of interactive devices; a content originating user of one of the plurality of interactive devices creating content, comprised of multimedia subject matter, and uploading the content to the network, such that the content upload is visible as a post notification on the network to select viewing users of the interactive devices communicably connected to the network; the content originating user of the one of the plurality of interactive devices, which uploaded the content to the network, also selecting an access event for associating with the content visible as the post notification; the access event being selected from the group consisting of: an event associated with an unborn person and an event for which no date has been defined at the time of the content upload; and wherein the multimedia subject matter comprising the content is inaccessible to the select viewing users of the interactive devices prior to occurrence of the access event; and wherein the multimedia subject matter comprising the content is automatically unlocked for access by the select viewing users of the interactive devices upon occurrence of the access event.

In certain embodiments of the invention, one or more users of the disclosed networks are provided with the ability to create a network profile for a person which is unborn. This may be done using software tools available on provided graphical user interfaces, for example. Afterwards, the person or persons creating a profile may select an access event associated with the unborn person and then post content associated with the access event. In other embodiments, of course, the person for which a profile is creating may be alive and already born.

In certain embodiments, the access event created will be an event for which no future occurrence date of the access event is known at the time of the posting of content associated with the access event. This may be, for example, because the profile being posted to is for an unborn person or because the event is one for which a date has not yet been envisioned (e.g., the expected wedding date of a young child, once they reach adulthood).

In preferred embodiments of the inventions disclosed herein, after an an initial content upload is made by an initiating user (via a post to the network), additional network users are permitted to upload additional content to be associated with the original or originating post. In such an embodiment, access to all of such content, cumulatively, may be unlocked upon occurrence of the access event chosen by the original content "poster".

Although any event type may be chosen or defined as an access event (and, in some embodiments, pre-populated event type choices will be provided in menus), a non-limiting example list of event types are: holidays such as Christmas, New Years Eve, Valentines Day; birthdays; wedding days; anniversaries; and dates of graduation or promotion or other days where congratulations or celebrations are practiced or desired.

In some, but certainly not all variants of the networks and methods described herein, opportunities to create and utilize geo tags are provided. In some of such embodiments, a network user can create a geo tag associated with a chosen geographical location (e.g., using a GPS device included in a mobile phone), and create a content upload (or post) associated with the geo tag. In such an embodiment, the post can be made to a profile of another network user (born or unborn) and when that chosen person visits the selected geographic location in the future, access to the geo-tagged post is unlocked.

At least one embodiment of the subject invention is embodied in, capable of being operated or implemented within, or is otherwise deployable in, a broadband network or cell phone network. In one example of such a network, a headend is utilized as a central or master facility for receiving internet or broadband communication feeds for processing and/or distribution over the illustrated internet network/system. An exemplar headend will normally have a multitude of receivers for reception of network transmissions from one or more types of internet providers. Transmissions are received for distribution across the network which may be a coaxial cable, copper wire telephone-type, or fiber optic network, for example. Though other network types may of course be employed, including cellular networks, the overall use of such a network is to provide two-way communication access so that users can send and receive data within the network. This may take place by delivering and distributing data via local optical nodes which, in turn, further distribute the data to individual users utilizing modems (or other processing hardware), for example. Internet connectivity may, of course, be provided by using different data exchange routes or delivery types, including cellular towers or satellite. While the inventions disclosed herein envision the use of mobile handsets, tablets, desktop computers, and servers (and the like), each with a data storage device and computer readable code stored in the data storage device (e.g., a hard drive or flash drive), some embodiments of the invention contemplate the use of cloud networks for storage, rather than relying solely on local storage.

Certain specific examples of the invention are now described below with respect to certain non-limiting embodiments thereof as illustrated in the following drawings wherein:

BRIEF DESCRIPTION OF CERTAIN EXAMPLE DRAWINGS

The drawings submitted with and which form a part of this patent application each illustrate an embodiment, or one or more components of an embodiment, of a non-limiting example of Applicants' invention. While these drawings depict certain preferred embodiments of Applicants' invention, as well as certain particularly desirable features thereof, they are intended to be examples only and should not be construed to limit the scope of Applicants' invention.

FIG. 1 illustrates one embodiment of an opening page, or main menu, of a graphical user interface usable with at least one example of the herein described inventions.

FIG. 2A illustrates another embodiment of a graphical user interface page or screen, useful for using the herein described networks, in accordance with one embodiment of the subject invention.

FIG. 6A illustrates another embodiment of a graphical user interface page or screen, useful for using the herein described networks, in accordance with one embodiment of the subject invention.

FIG. 6B illustrates another embodiment of a graphical user interface page or screen, useful for using the herein described networks, in accordance with one embodiment of the subject invention.

FIG. 6C illustrates another embodiment of a graphical user interface page or screen, useful for using the herein described networks, in accordance with one embodiment of the subject invention.

FIGS. 10A-F illustrate additional embodiments of graphical user interface pages or screens, useful for using the herein described networks, in accordance with one embodiment of the subject invention.

Figure 11:
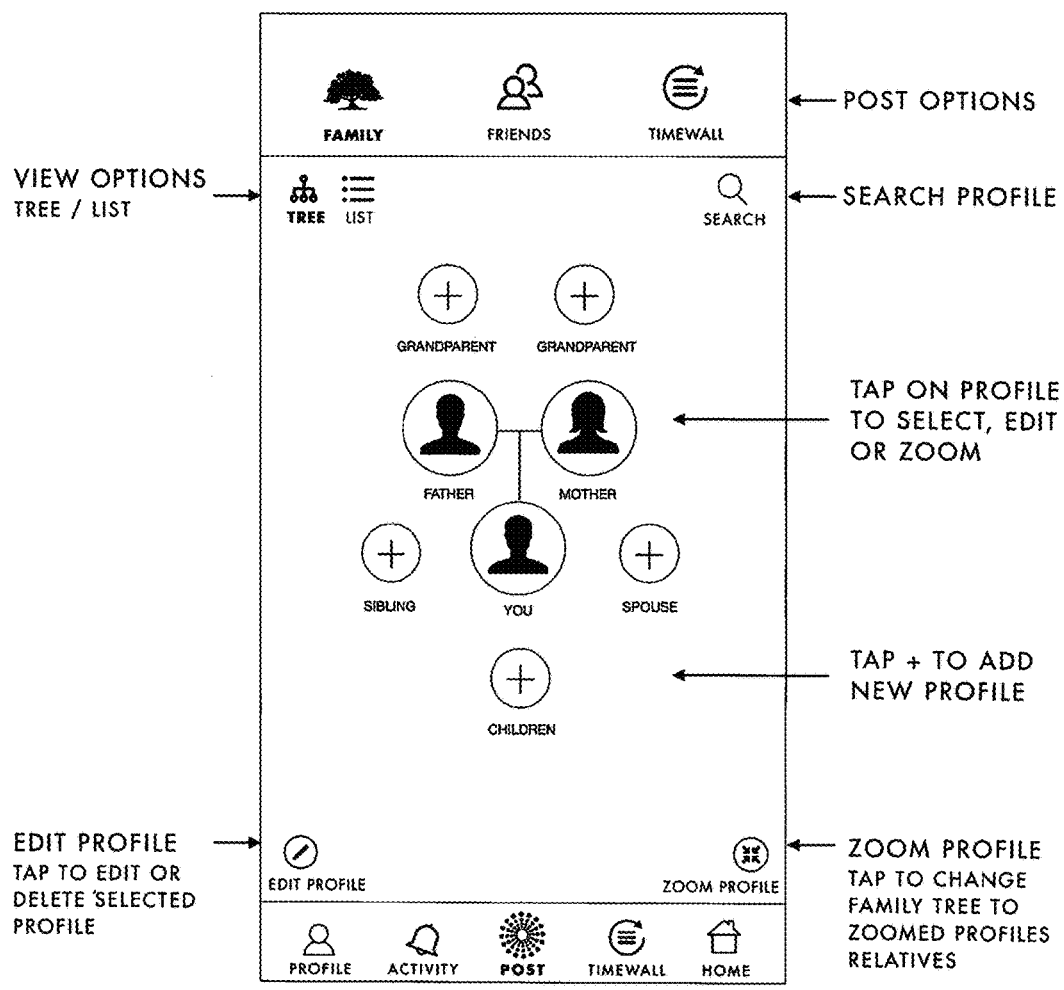

FIG. 11 illustrates another embodiment of an opening page, or main menu, of a graphical user interface usable with at least one example of the herein described inventions.

FIG. 12 illustrates another embodiment of a graphical user interface page or screen, useful for using the herein described networks, in accordance with alternative embodiments of the subject inventions.

Figure 13:
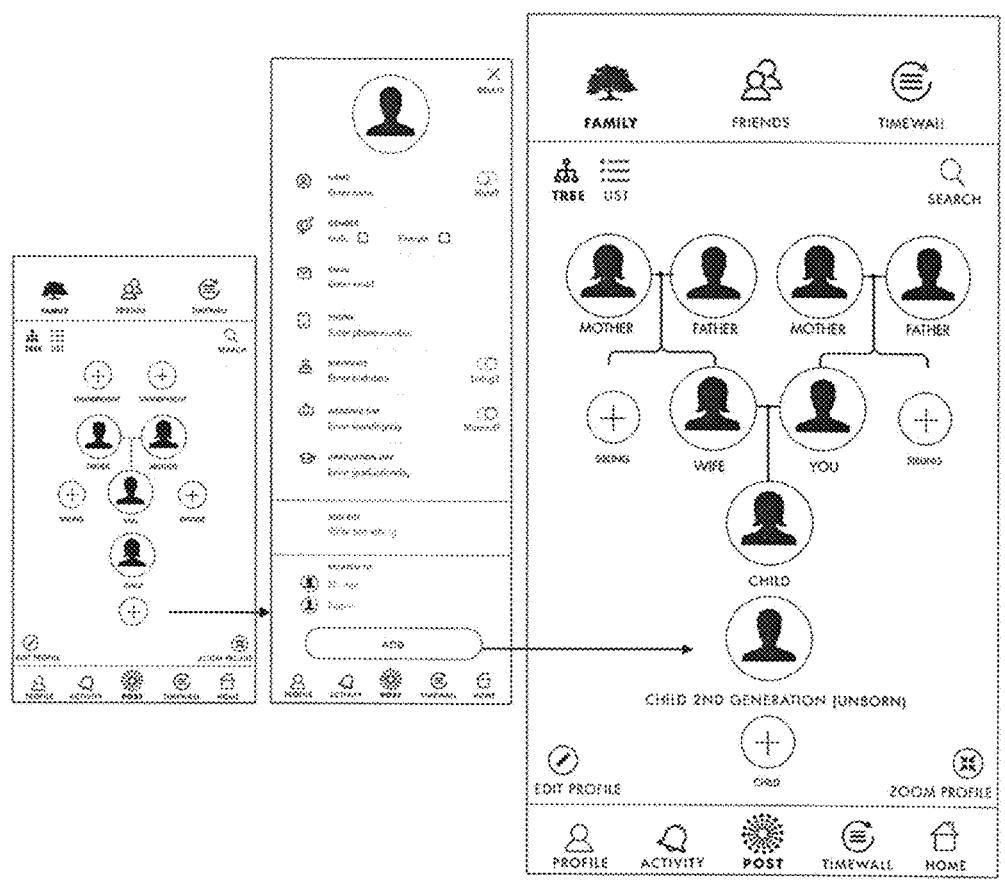

FIG. 13 illustrates another embodiment of a graphical user interface page or screen, useful for using the herein described networks, in accordance with alternative embodiments of the subject inventions.

Figure 14:
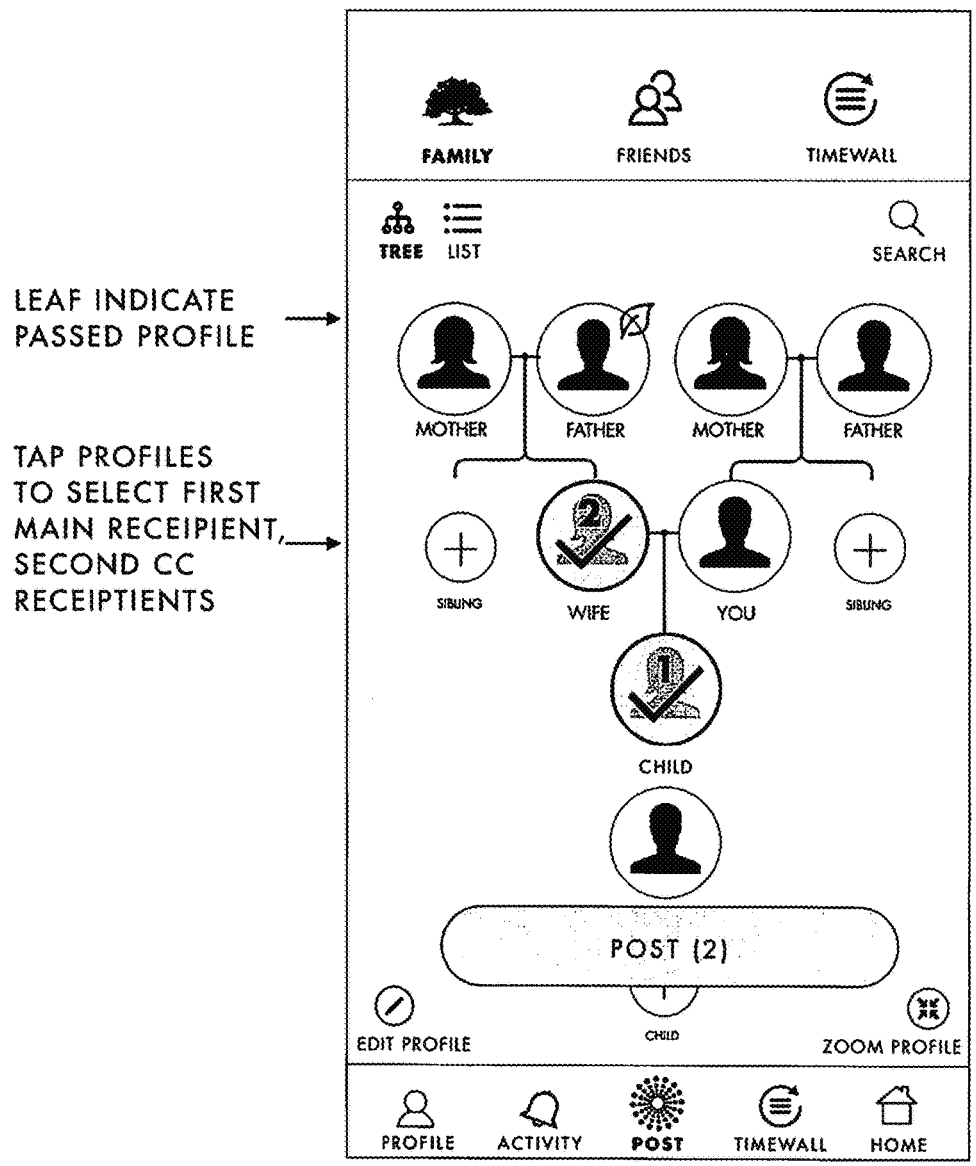

FIG. 14 illustrates another embodiment of a graphical user interface page or screen, useful for using the herein described networks, in accordance with alternative embodiments of the subject inventions.

Figure 15:
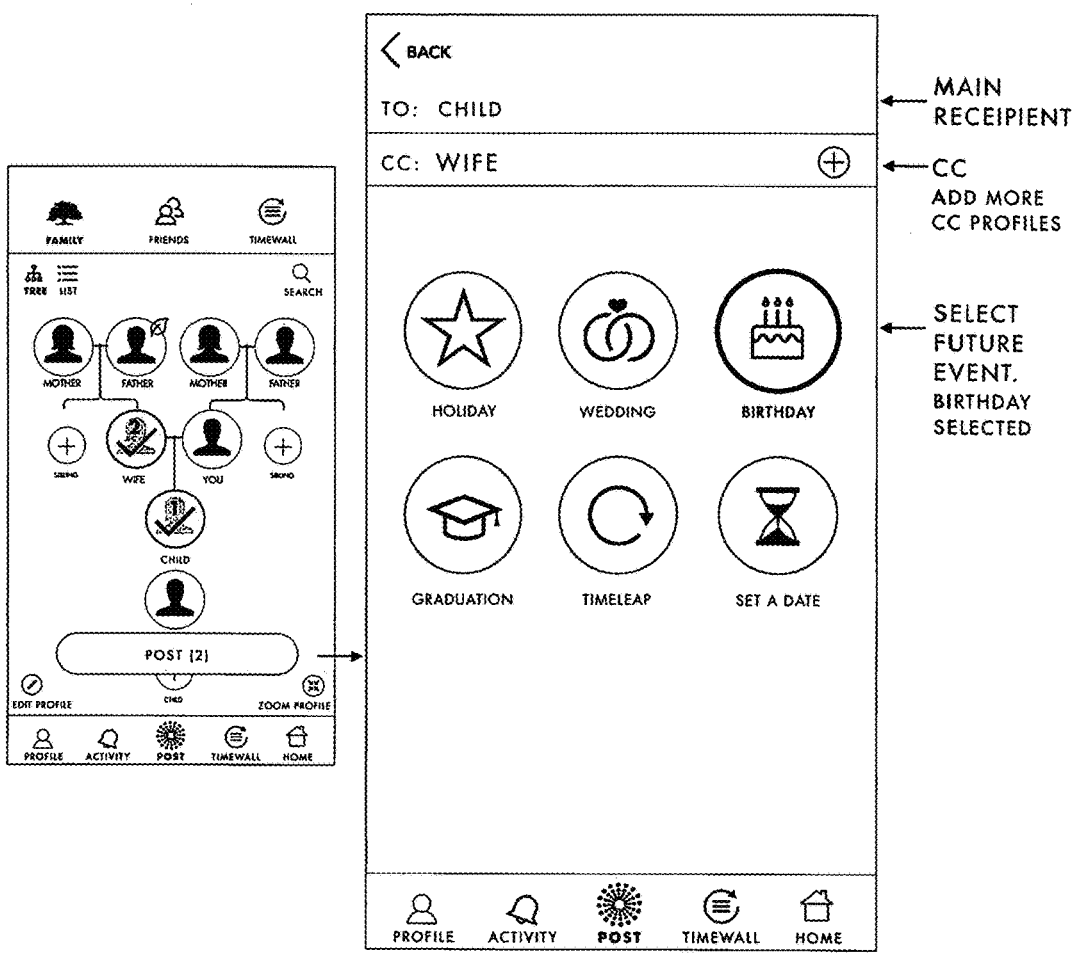

FIG. 15 illustrates another embodiment of a graphical user interface page or screen, useful for using the herein described networks, in accordance with alternative embodiments of the subject inventions.

Figure 16:
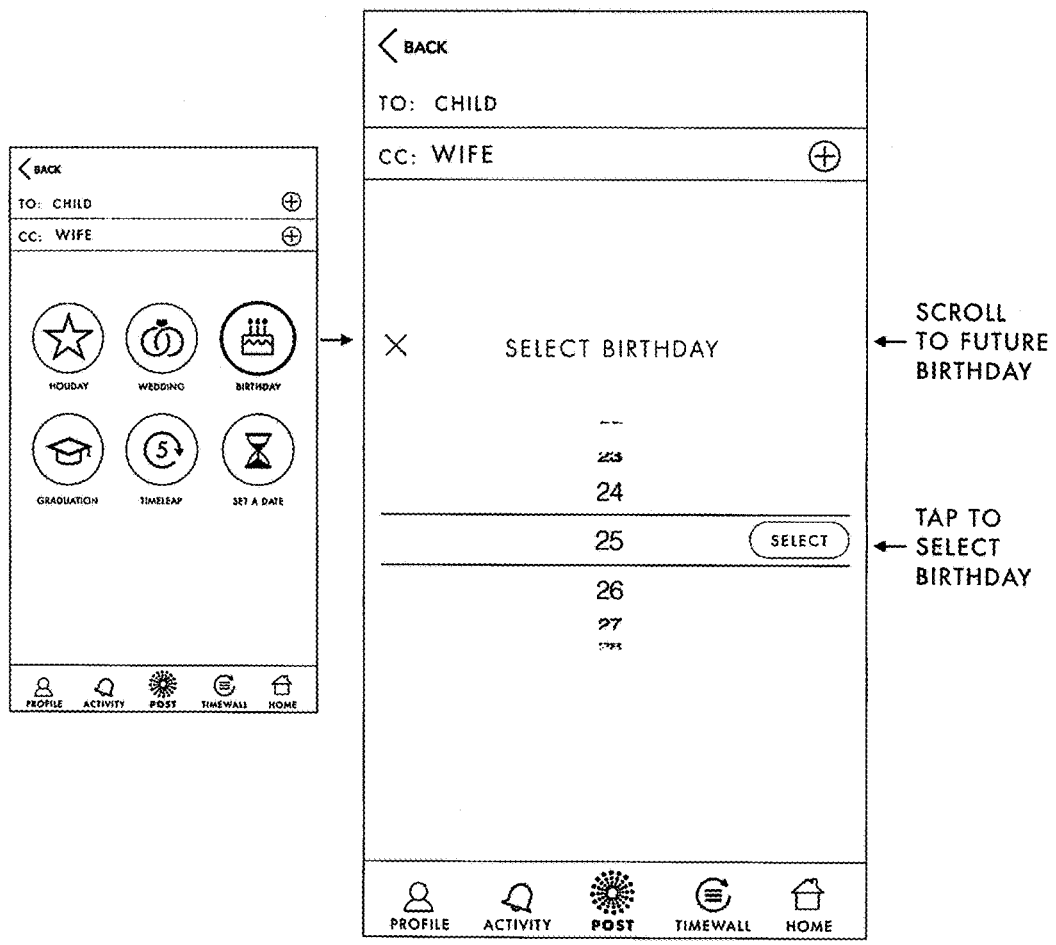

FIG. 16 illustrates another embodiment of a graphical user interface page or screen, useful for using the herein described networks, in accordance with alternative embodiments of the subject inventions.

Figure 17:
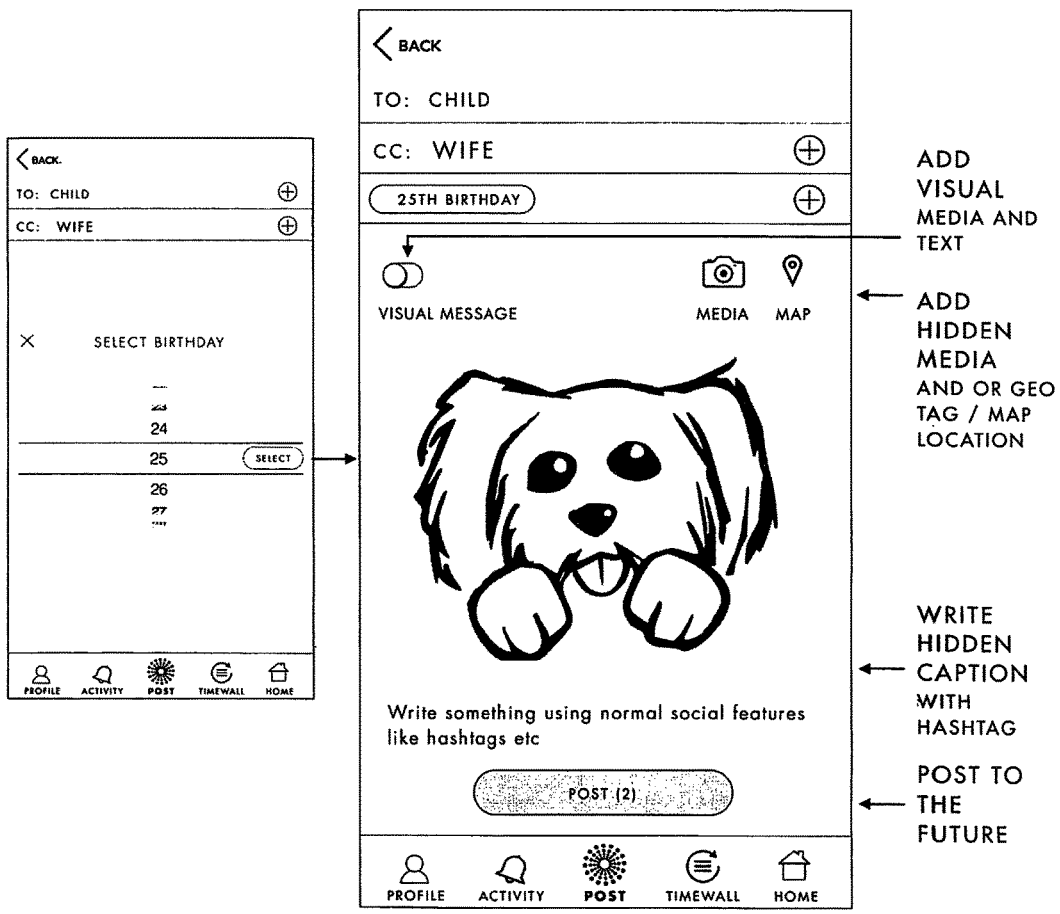

FIG. 17 illustrates another embodiment of a graphical user interface page or screen, useful for using the herein described networks, in accordance with alternative embodiments of the subject inventions.

Figure 18:
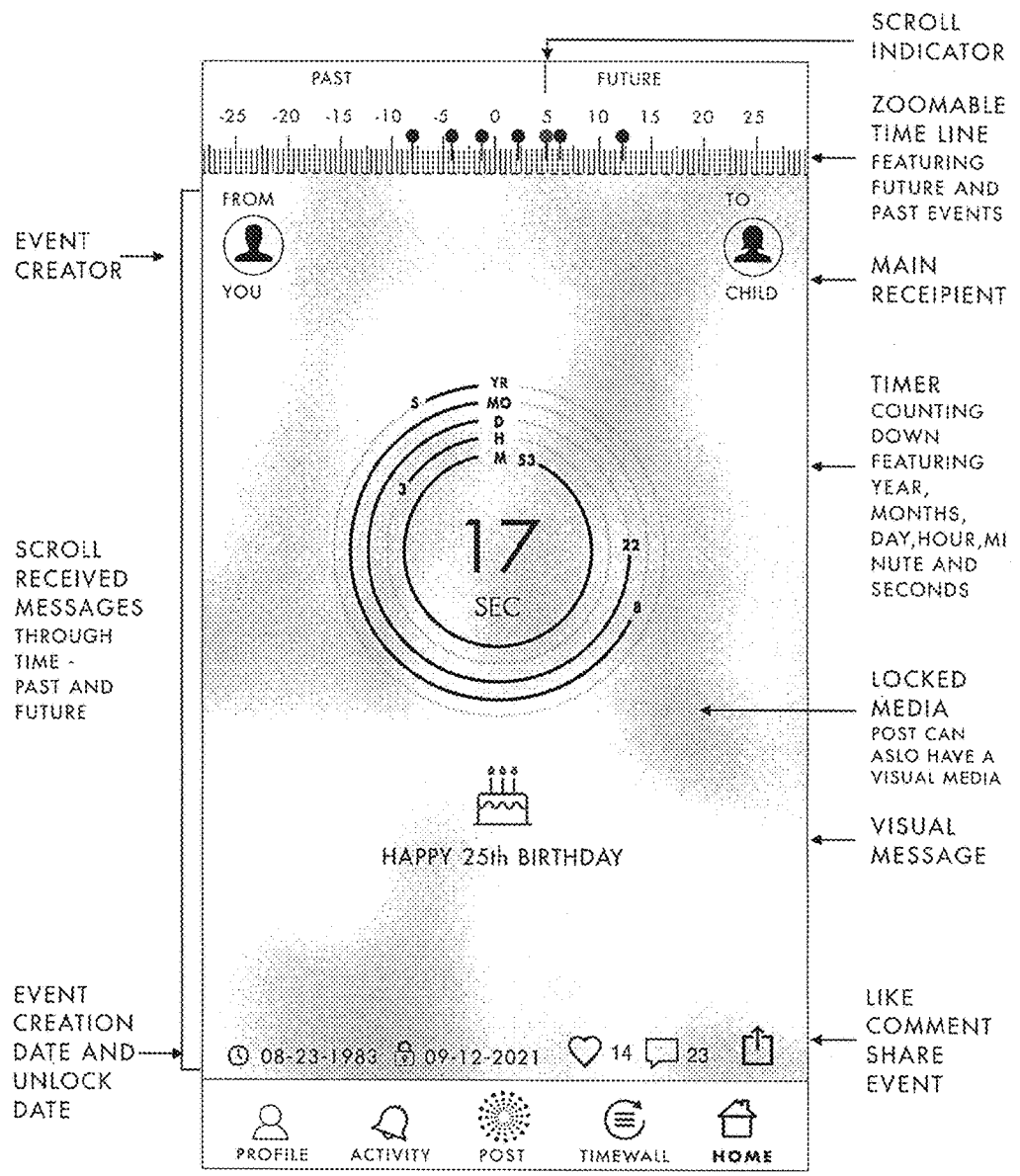

FIG. 18 illustrates another embodiment of a graphical user interface page or screen, useful for using the herein described networks, in accordance with alternative embodiments of the subject inventions.

Figure 19:
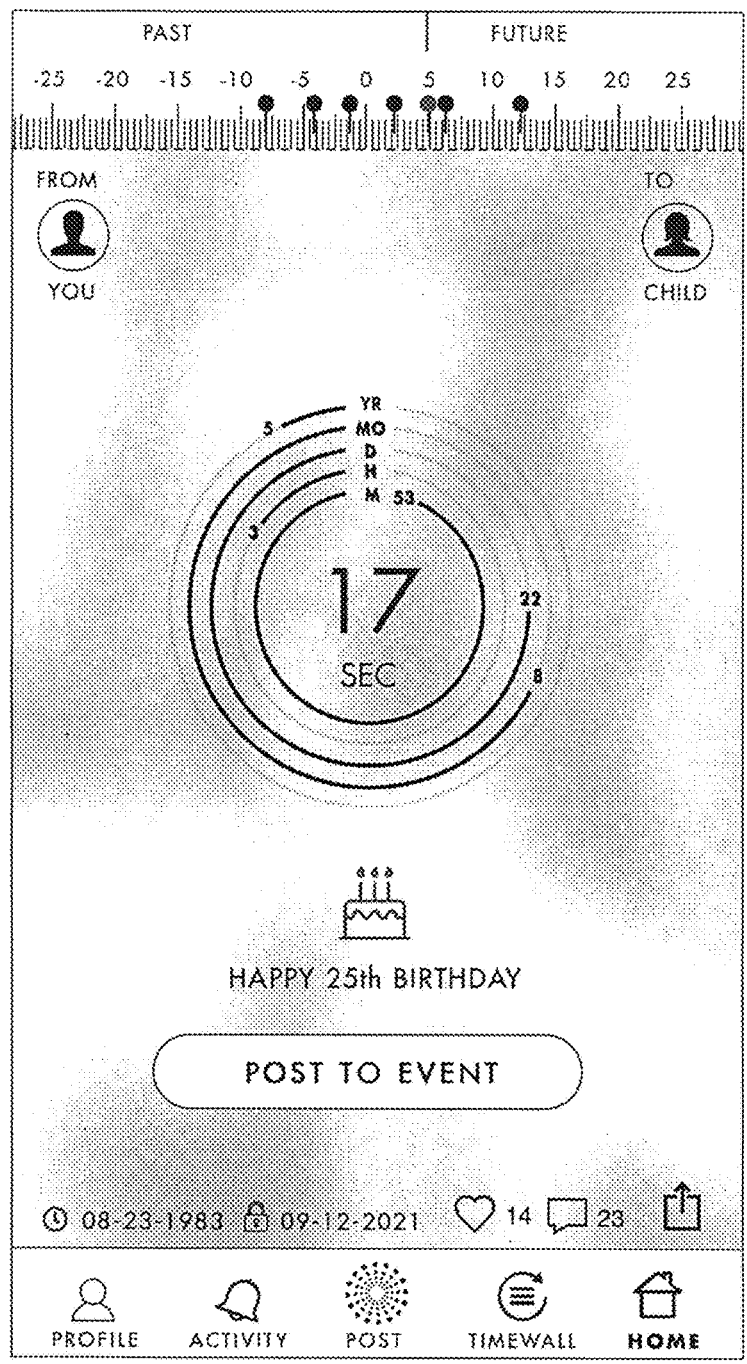

FIG. 19 illustrates another embodiment of a graphical user interface page or screen, useful for using the herein described networks, in accordance with alternative embodiments of the subject inventions.

Figure 20:
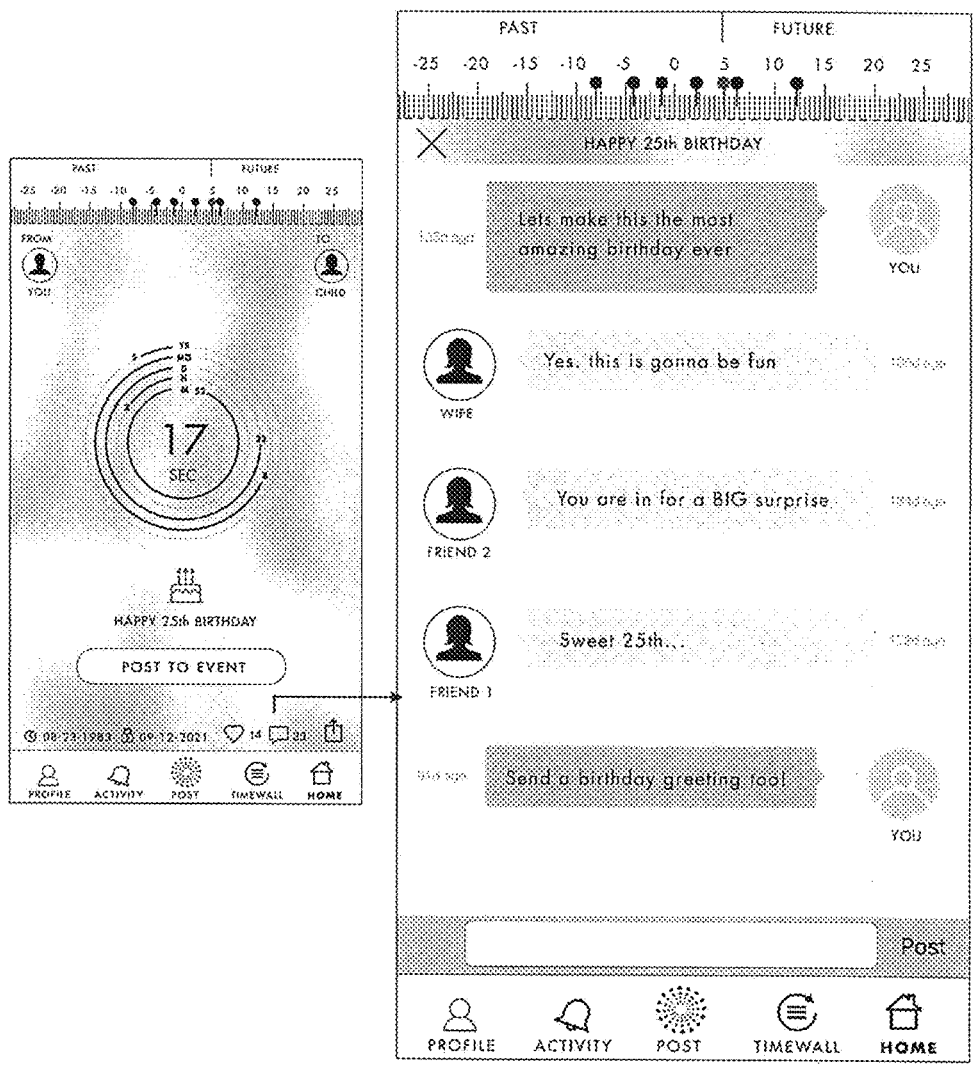

FIG. 20 illustrates another embodiment of a graphical user interface page or screen, useful for using the herein described networks, in accordance with alternative embodiments of the subject inventions.

Figure 21:
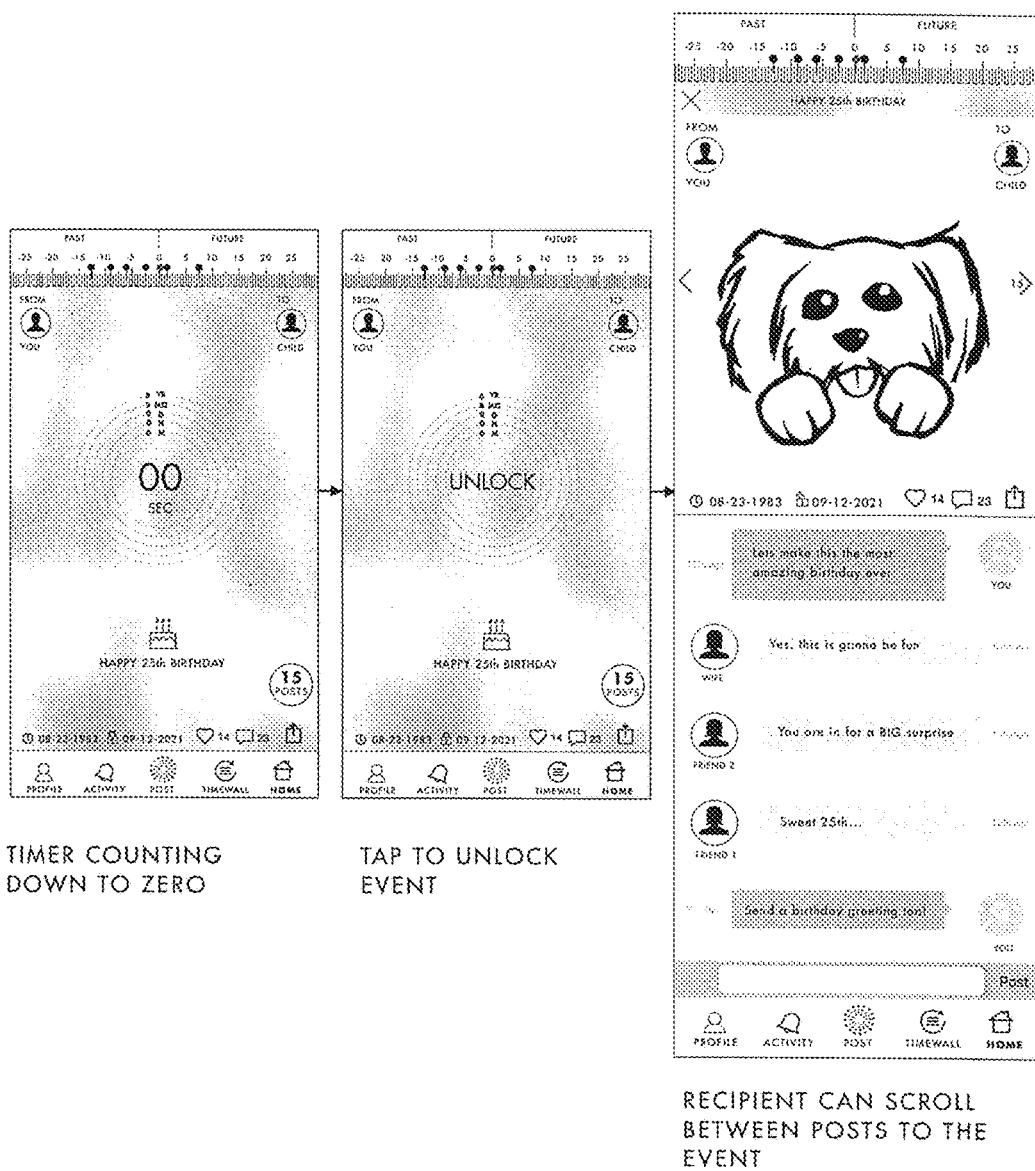

FIG. 21 illustrates another embodiment of a graphical user interface page or screen, useful for using the herein described networks, in accordance with alternative embodiments of the subject inventions.

Figure 22:
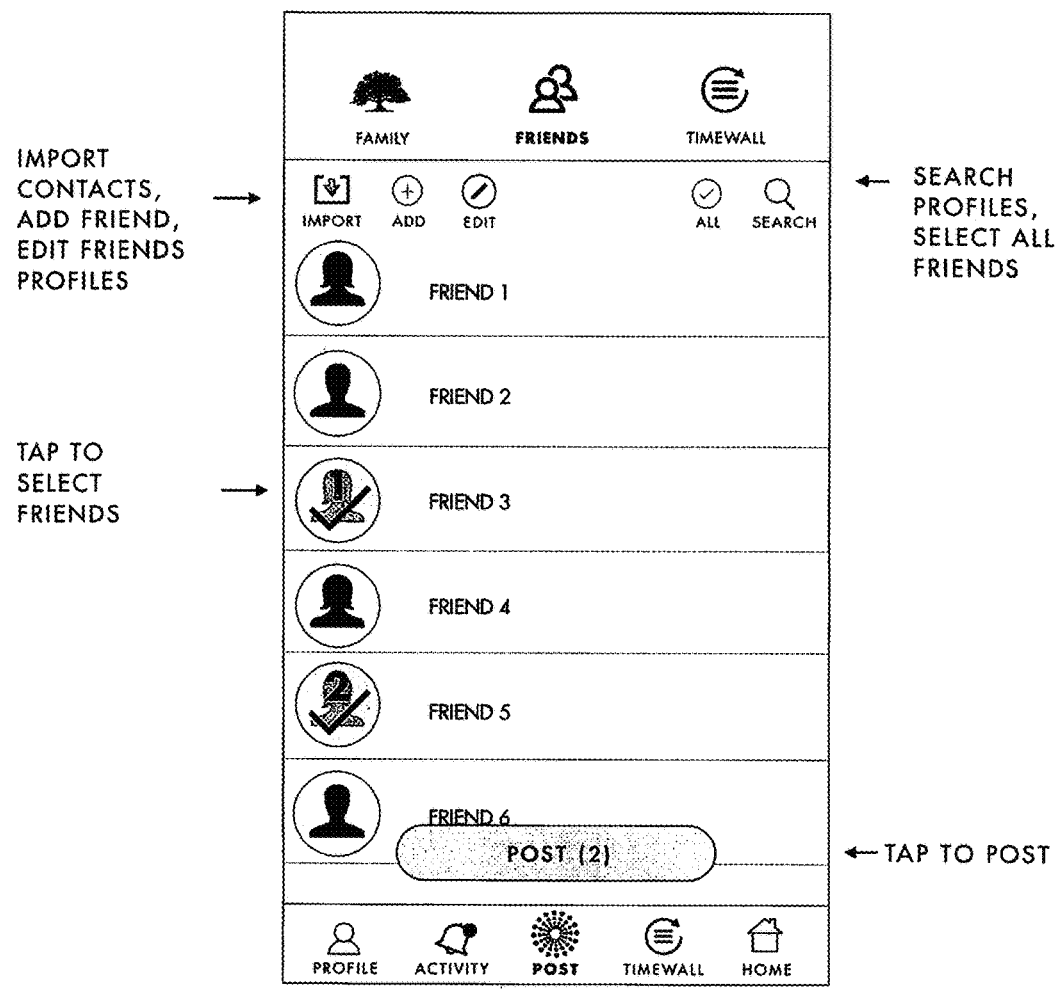

FIG. 22 illustrates another embodiment of a graphical user interface page or screen, useful for using the herein described networks, in accordance with alternative embodiments of the subject inventions.

Figure 23:
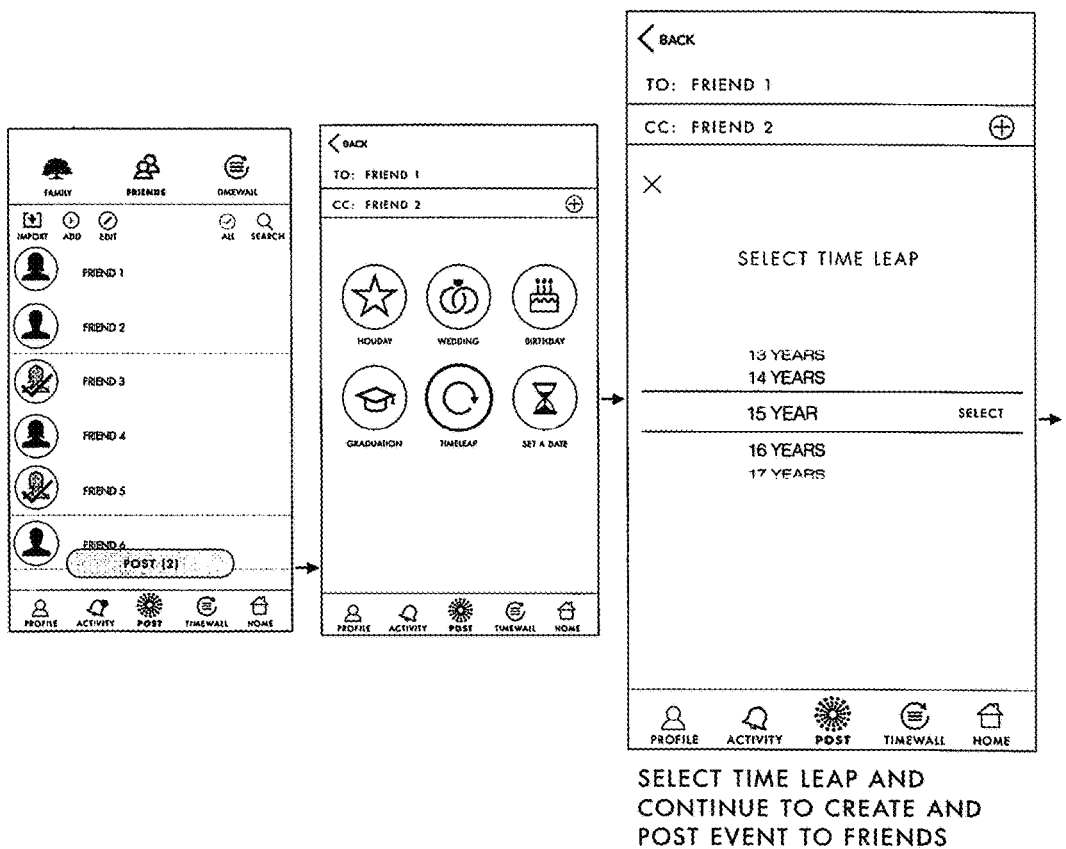

FIG. 23 illustrates another embodiment of a graphical user interface page or screen, useful for using the herein described networks, in accordance with alternative embodiments of the subject inventions.

Figure 24:
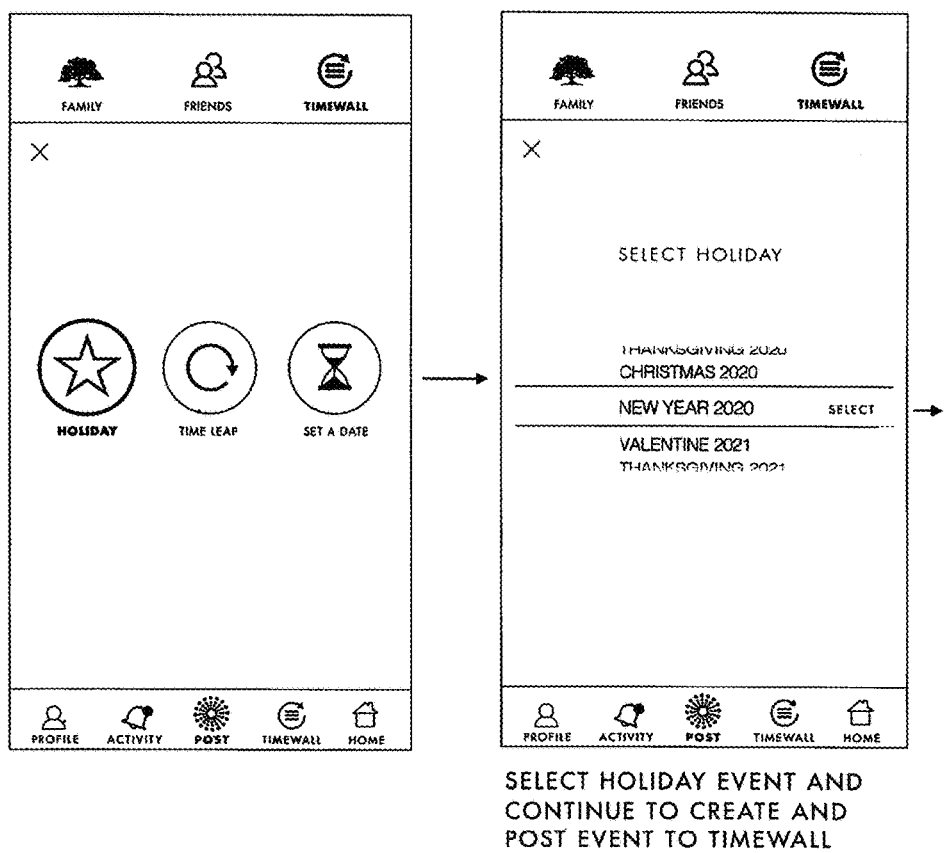

FIG. 24 illustrates another embodiment of a graphical user interface page or screen, useful for using the herein described networks, in accordance with alternative embodiments of the subject inventions.

Figure 25:
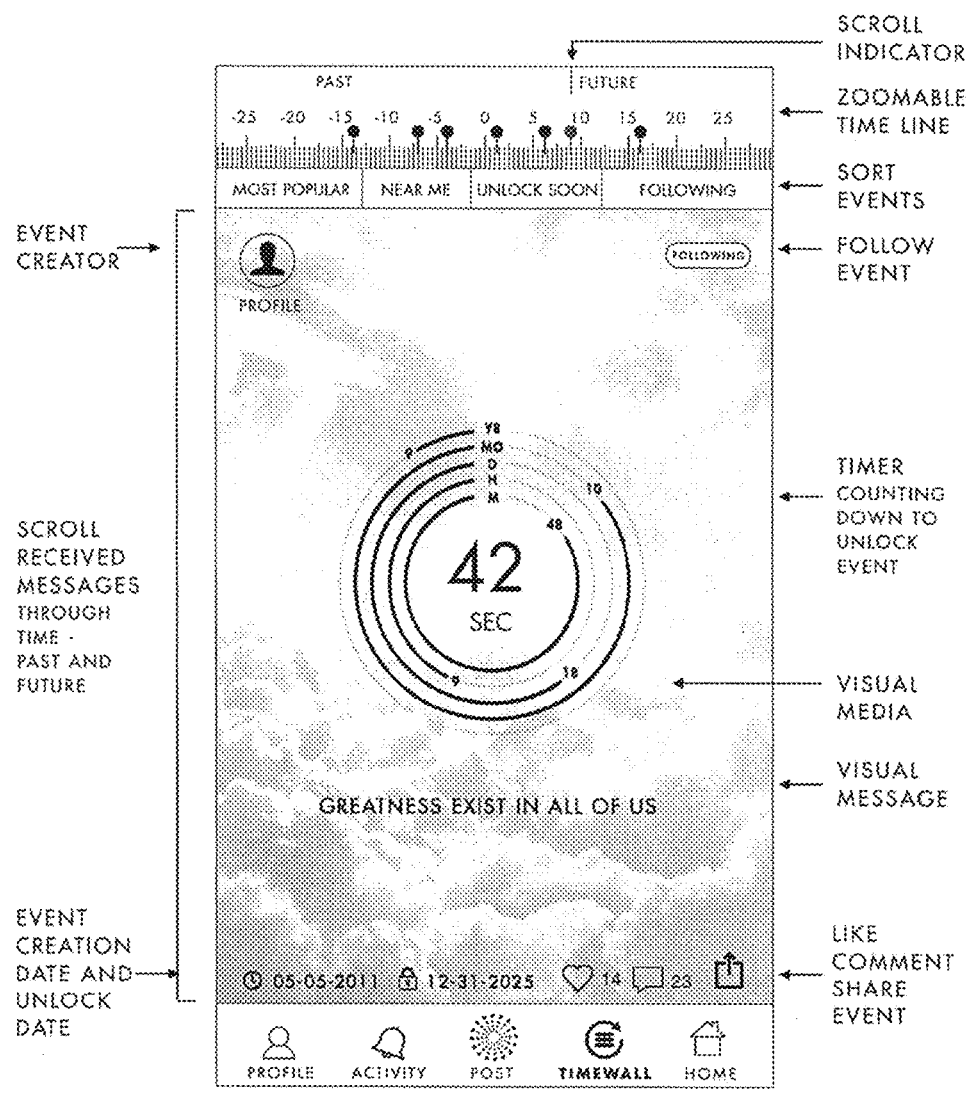

FIG. 25 illustrates another embodiment of a graphical user interface page or screen, useful for using the herein described networks, in accordance with alternative embodiments of the subject inventions.

Figure 26:
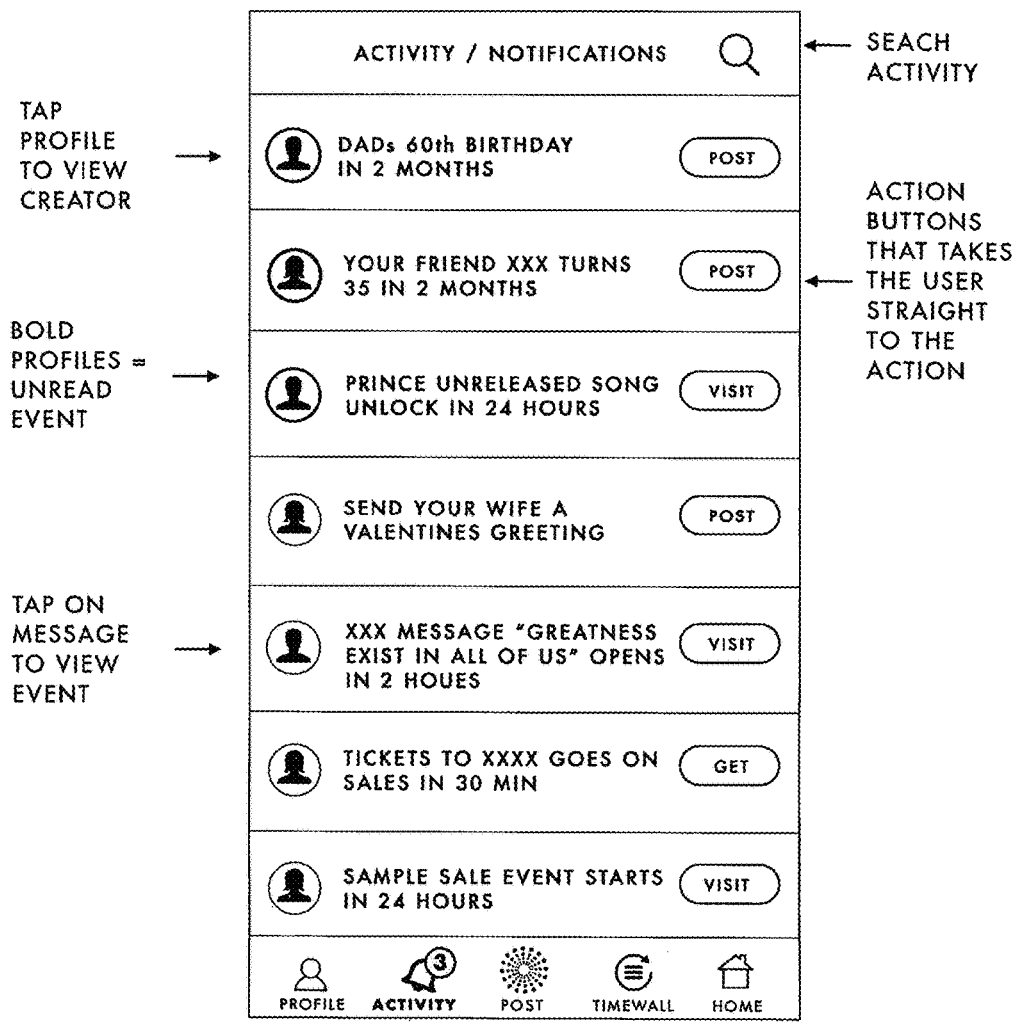

FIG. 26 illustrates another embodiment of a graphical user interface page or screen, useful for using the herein described networks, in accordance with alternative embodiments of the subject inventions.

Figure 27:
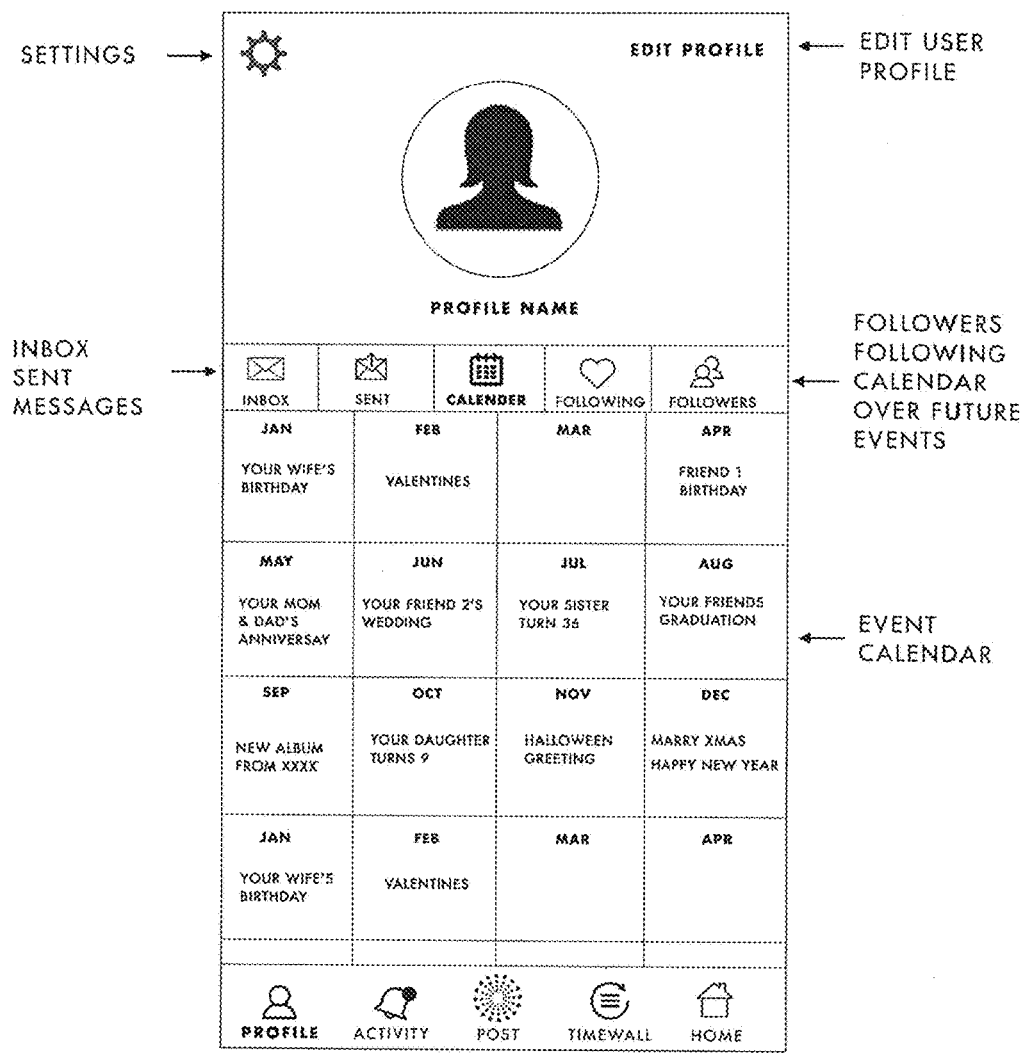

FIG. 27 illustrates another embodiment of a graphical user interface page or screen, useful for using the herein described networks, in accordance with alternative embodiments of the subject inventions.

DETAILED DESCRIPTION OF CERTAIN EXAMPLE EMBODIMENTS OF THE INVENTION

For a more complete understanding of the present invention, reference is now made to the following description of various illustrative and non-limiting embodiments thereof, taken in conjunction with the accompanying drawings in which like reference numbers indicate like features.

The invention is, in certain non-limiting embodiments, an online mobile application and/or desktop web platform where users of a network can post messages into the future and/or to profiles of unborn persons (e.g., family members of future generations).

Example Embodiment:

In one version of the herein described inventions, a web based network is provided which includes, as members, a plurality of human users. The network is configured so that a user or users can post content or messages to the network for future access (i.e., "to the future"). This content may be text, images, audio, video, virtual reality content, any other multimedia type (including those not yet contemplated), or any combination thereof.

In a preferred iteration of a network, once at least one profile is created on the network, a user of the network can select one or more profiles(s) and a "post to the future" may be made in the selected profile(s) by selecting a post radio button or menu, such as that shown in FIG. 1. Such a post may be a message or other content which the posting user wishes to communicate pertaining to an access event selected. An "access event" is the event which is chosen to associate with posted content and is also the event which unlocks access to the content upon its occurrence. Access events may be any event desired including wedding days, wedding anniversaries, birthdays, holidays (Christmas, Valentines Day, New Years, etc.), or any other day of significance. While the network is preferably populated with suggested access events (accessible in menus provided in the GUI), custom events can be created and added to the network in preferred embodiments. Another optional but preferred feature is the inclusion of "time lap" posting options. In such options, rather than a user being forced to choose a specific life event to post to, the user can simply choose a set number of years in the future (e.g., 5, 10, or 15 years, etc. in the future). Using such a time leap feature (as an access event), when the expiration of the selected time occurs, access to the posted content is unlocked for the desired other network users. Similarly, an arbitrary date can be elected as an access event in lieu of selecting a conventional event or a time leap type date.

Figure 2B:
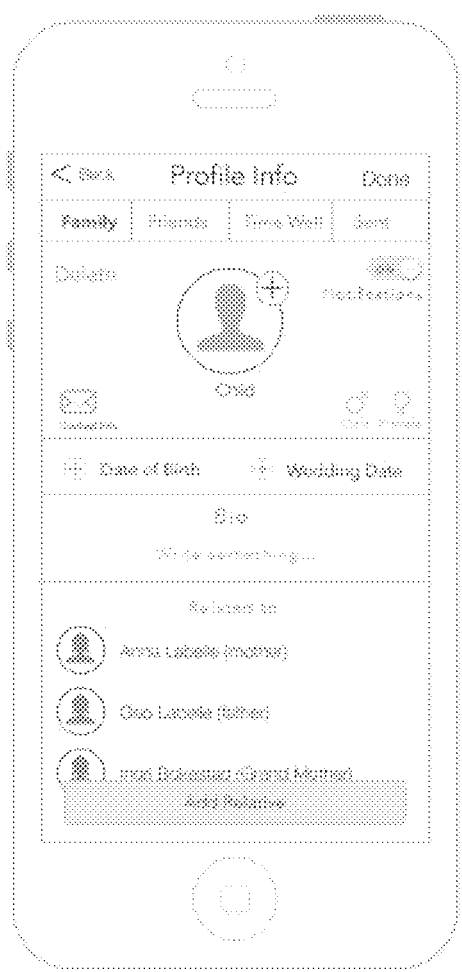
FIG. 2B illustrates another embodiment of a graphical user interface page or screen, useful for using the herein described networks, in accordance with one embodiment of the subject invention.

In the preferred example network discussed herein, a post can be made to an existing profile, or the user can add family or friend profiles using "add" controls, such as those depicted in FIG. 2A. Moreover, information or data for each profile may be added or updated, such as birthdays, wedding days, graduation days, anniversaries, holidays, etc. (see, e.g., FIG. 2B). When it is desired to add or create profiles for unborn persons (e.g., future family generations), a user can do so using the "family tree" building controls depicted in FIG. 3A. Of course, other GUI configurations or designs may be utilized to obtain the same functionality.

In addition to options already discussed, the system can be tailored for specific geographic locales or cultures. In other words, the network may detect the geographic location of the user (e.g., by analyzing IP addresses), or the network may simply interpret locale or geographic data entered by a user, such as data entered as part of a user profile, in order to provide customized access event menus. For example, if a user is detected as residing in France, an option may be provided to select Bastille Day as an access event. In another example, if a user is determined to be located in a Latin American country, or to be of Latin American descent, and also female, the network may provide "quinceañera" as an option to select for an access event (e.g., by searching a database for gender specific cultural events, cross-referenced with the users location or ethnicity). In preferred versions of these embodiments, if more than one profile is selected when one or more access events are being selected, the system may be configured to automatically adapt the posting option (for each user profile) by removing non-relevant options, such as the culturally pertinent or geography specific events discussed immediately above (e.g., such as if one person is residing in France, and the other in Brazil).

Figure 3A:
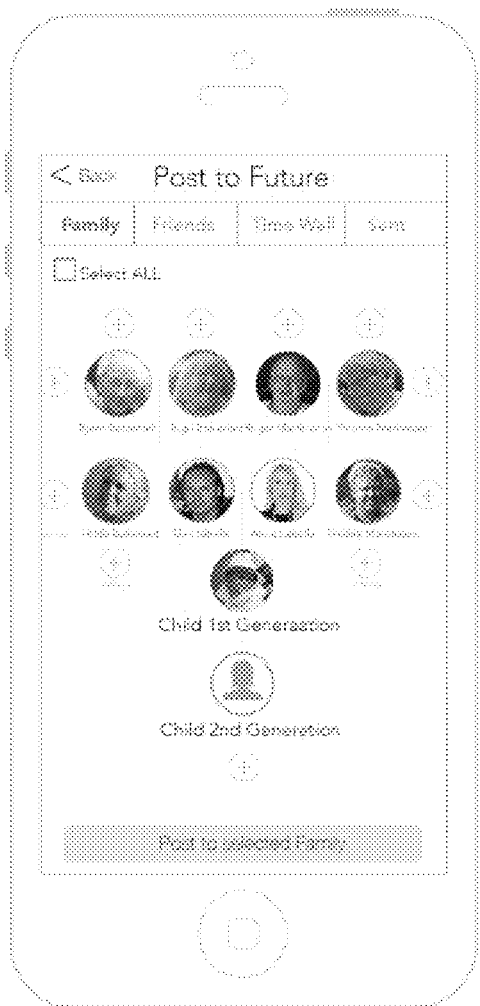
FIG. 3A illustrates another embodiment of a graphical user interface page or screen, useful for using the herein described networks, in accordance with one embodiment of the subject invention.
Figure 3B:
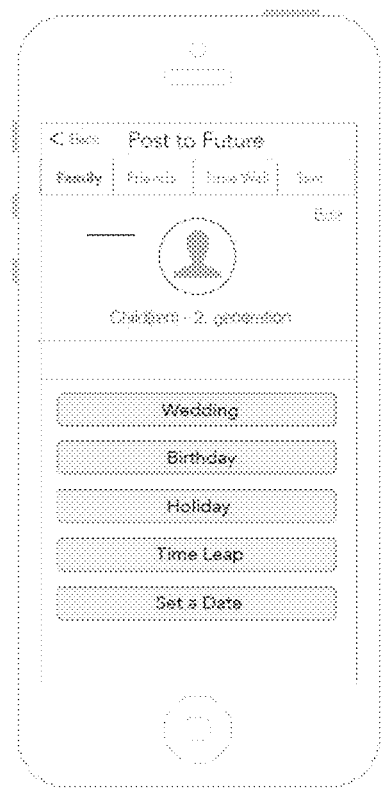
FIG. 3B illustrates another embodiment of a graphical user interface page or screen, useful for using the herein described networks, in accordance with one embodiment of the subject invention.
Figure 3C:
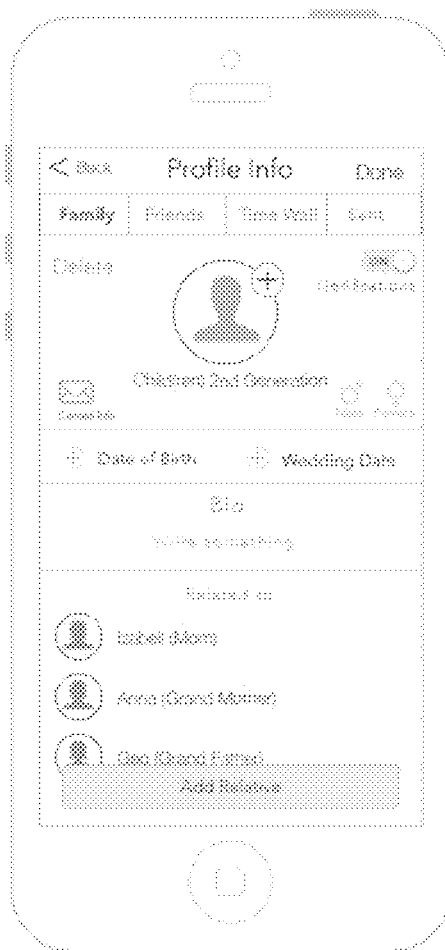
FIG. 3C illustrates another embodiment of a graphical user interface page or screen, useful for using the herein described networks, in accordance with one embodiment of the subject invention.

In preferred embodiments, a user can edit and/or update a profile or even delete a profile if there are no exiting posts to that profile (FIG. 3C). Of course, override features may be provided to delete profiles—even when they are associated with existing posts—when desirable.

Once a network user elects to post into a specific profile's future, the user is provided with various posting options. For example, if a user is posting to an existing or "born" person's profile, in order to enable ease of use, a scrolling list of birthdays may be provided in a "menu" for quick selection. See, e.g., FIG. 4B where a person's 25th birthday is shown being selected. The posting user can then write or record or upload content to be used in the post. In optional embodiments, stock content (e.g., stock images or messages) may be provided by the network either to use alone or as part of an assimilation of content for the post. When the post is complete, other network members can be notified of the post creation by messages automatically transmitted by the network (such as a result of defined share lists or parameters), or the posting user can manually carbon copy (or "cc") other network users, such as family members or friends (see, e.g., FIG. 4C). Also, at the time of post (or after if desired), geo tags can be added or the post may be marked for assimilation by other networks (e.g., such as with a hashtag so that the post notification is added to Twitter). While the content of a "post to the future" is normally locked to prevent access until occurrence of an access event, a post title, message, or data point may be made purposefully visible even prior to the unlocking access event. An example of a GUI solution to this embodiment is also depicted in FIG. 4C where an option is provided to add a so-called "visual message" (e.g., a message which is visible prior to content unlocking).

In preferred embodiments, at least for certain post types, it is desirable to allow multiple users to add content (or their own post) to a particular posted event. For example, if a post for a person's birthday is added to the network by the person's father, the person's friends may be notified of the creation and existence of the post. Such friends may be provided with the ability to add their own content to the original post, with a plurality of people therefore participating in a single content post (associated with and unlockable with the same access event). It is desirable, in some of such embodiments, to allow the post "target" (the person which is the subject of the post) to see the participants in the post. That is, a list of persons that have uploaded content may be shown to the post "target" even though the content itself will remain locked until the occurrence of the access event.

Figure 5A:
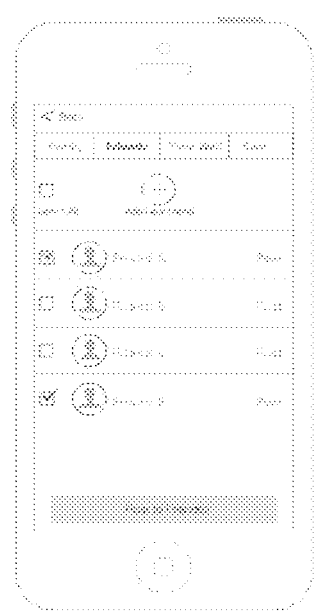
FIG. 5A illustrates another embodiment of a graphical user interface page or screen, useful for using the herein described networks, in accordance with one embodiment of the subject invention.
Figure 5B:
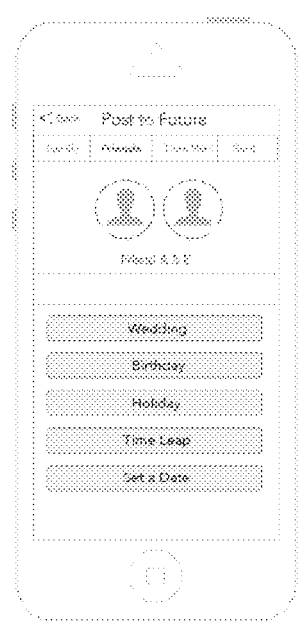
FIG. 5B illustrates another embodiment of a graphical user interface page or screen, useful for using the herein described networks, in accordance with one embodiment of the subject invention.
Figure 5C:
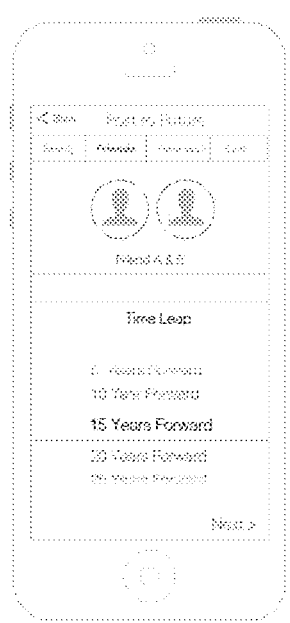
FIG. 5C illustrates another embodiment of a graphical user interface page or screen, useful for using the herein described networks, in accordance with one embodiment of the subject invention.

Similar to the other posting mechanisms described above, a user can post content to a plurality of other network users simultaneously. For example, a user can create a friends list, or a message list which is tailored to a particular user audience. Such a friends list can be created such as shown in FIG. 5A. In next steps, such as shown in FIG. 5B and FIG. 5C, a future access event can be selected (i.e., a time leap of 15 years in this example), and afterwards the same options as described above may be provided to post a message or other content into the future. While profiles can be manually imported or added, profiles can also be automatically imported via connected applications such as Facebook and twitter and by downloading data from "contact lists" such as often found in directories of mobile devices or as stored in programs such as Outlook. Automatic updates of lists can be completed by periodically performing cross checks of the same or similar sources.

As another option when using the network, a user can post to a public time wall such as disclosed in FIG. 6A. Such a post can be completed by selecting a future access event, an arbitrary future date, or a time leap date, and then creating a content upload to serve as the post to the future. For example, a user can choose New Year 2020 from a "Holiday" menu, such as shown in FIG. 6B, and then post a message or upload content to be unlocked upon such date. Optionally, the post may include a geo tag, may be hashtagged to be added to Twitter, or may include "visual message" text or title information (e.g., see FIG. 6C).

Figure 7:
FIG. 7 illustrates another embodiment of a graphical user interface page or screen, useful for using the herein described networks, in accordance with one embodiment of the subject invention.

In preferred but optional embodiments, already sent or posted messages are available on a sortable and searchable list (see, e.g., FIG. 7) where they can be viewed and edited, or deleted if they have not been unlocked already. Furthermore, network users can visit the Time Wall (see, e.g., FIG. 8A) to view public messages. In preferred embodiments as shown, the Time Wall is divided into past and future messages such as shown in FIG. 8B. Past messages are open, unlocked messages that can be viewed at any time. Future messages preferably display a count down clock or timer which visually indicates when the future messages will be unlocked. Preferably, all Time Wall messages are both searchable and sortable and a user can "follow" profiles (e.g., by selecting a "follow" option) to get notifications about activity (such as shown in FIG. 8B).

Figure 9A:
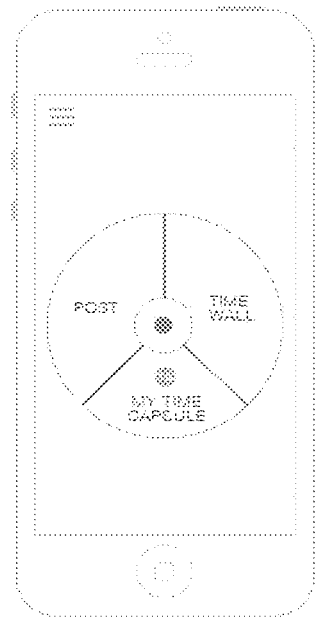
FIG. 9A illustrates another embodiment of a graphical user interface page or screen, useful for using the herein described networks, in accordance with one embodiment of the subject invention.
Figure 9B:
FIG. 9B illustrates another embodiment of a graphical user interface page or screen, useful for using the herein described networks, in accordance with one embodiment of the subject invention.
Figure 9C:
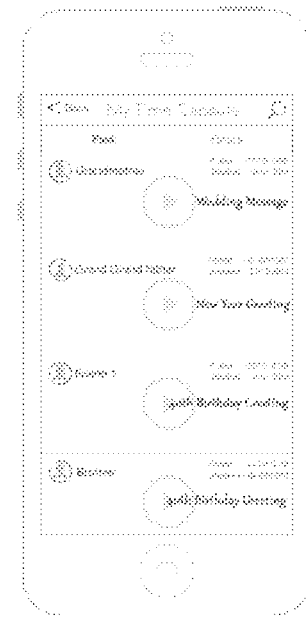
FIG. 9C illustrates another embodiment of a graphical user interface page or screen, useful for using the herein described networks, in accordance with one embodiment of the subject invention.

In preferred embodiments, each network user is provided with a "My Time Capsule" menu, such as shown in FIG. 9A, that compiles all messages received by a user. The received messages are preferably automatically divided into past and future categories, such as shown in FIG. 9B. Future accessible messages (identified in the menu heading "Future") are displayed with data indicating the message sender, the date it was send, and the date or event upon which the message or other content will be unlocked. Preferably, the future accessible messages also include a visual timer which visually depicts a countdown to the time when the respective message will be unlocked. Unlocked, past messages can viewed at any time and a preview of each is preferably displayed such as shown in FIG. 9C. If a message is selected (e.g., clicked on using the provided GUI), the network user is provided with the capability of replying, forwarding, and sharing the message or even deleting the message.

In preferred embodiments of the invention, the provided GUI is configured to include notifications for receipt of messages (which may be "pushed" to the network user). This includes notifications of receipt of new future-accessible messages (see, e.g., FIG. 10A). Moreover, settings are preferably provided by which notification preferences can be edited or tailored. For example, a profile may be tailored or even configured by default so that the system will automatically notify network users about a profile's life events (e.g., such as birthdays, wedding days, etc.). See, e.g., FIG. 10B. In the example GUI illustrated, the main menu includes a button to view all notifications that a network user has received. Preferably, when clicking on a notification, the system will take the user to that specific post. Settings can also be tailored, or set as a default configuration, so that all connected family and friends automatically receive relevant notifications (e.g, they may be opted into receiving relevant notifications, by default).

Additional Optional Features:

- If a user has "favorited" a profile on a time wall (when this option is provided), the system will notify the user about activity generated by the "favorited" profile, such as when a message is about to be unlocked (see, e.g., FIG. 10C).
- The system may be configured to automatically notify users to update profiles. For example, if future-accessible messages are posted to a specific profile, and data is provided in the post which is pertinent to the profile (e.g., an upcoming wedding or anniversary date), the posted to profile may be automatically updated with such data. See, e.g., FIG. 10D.

The network can be configured to regularly seek profile updates, to keep profile information up to date and to ensure proper delivery of messages.

In certain embodiments, an option may be provided to mark a profile as deceased, such as with a symbol or other indicator on a person's profile. In such or other embodiments, if an unborn "person" with a profile is never born or if a person with a profile dies before a future message is unlocked, the system can be configured so that posted messages to such profiles will not be accessible.

In optional embodiments, the system is configured to allow a network user to create geo tagged messages to send "to the future" or to receive geo tagged messages from the past. For example, in one such embodiment, if a user has activated geo tags (e.g., and configured settings to receive notifications from family and friends), the user will receive notifications from the past family and friends when the user is in proximity to the geo tagged locations (associated with respective geo tagged messages). See, e.g., FIG. 10E. In a more specific example, if a user's great grandfather creates a geo tagged message or post (possibly when the user is not yet born), the respective user may receive a notification that his great grandfather was at the arrived at location(s), in conjunction with a link or invitation to open the post. The user can then experience a place through his great grandfather's "eyes" generations back in time. Similarly, if a user chooses to activate geo tag notifications originating from the time wall (e.g., a public time wall), the user will be notified about time wall posts association with a specific tagged location and will be provided with an invitation or clickable link to access a list of messages tagged at that location (see, e.g., FIG. 10F). The user can then, for example, explore how the place has developed over time (or explore events which occurred there) through the messages posted to the time wall with geo tags.

In at least one embodiment, verification features may be employed in connection with unlocking messages, images, videos, or other content posted for access in the future. For example, for events with variable or unpredictable dates such as weddings (e.g., which are not self-verifiable) a feature may be employed to verify the accuracy or existence or occurrence of the event. In one such example, if a wedding date is added to the system, the system may optionally utilize a feature where such wedding date (or similar type date) must be validated by one or more other system users. Utilizing a validation procedure can prevent a user from creating fake occurrence dates for events for the purposes of accessing future content which will otherwise be displayed only upon the genuine occurrence of such event.

Summary Description of Example Screen Functions (Embodiment 1)

FIG. 1

Main Menu:

FIG. 1 displays a GUI page with a Main Menu. Users have three main options—post, my time capsule, and time wall.

"Post" allows for the creation of and editing of profiles, posting of content and information to a profile's future, posting of content and information to a public time wall at specific future events or time, and the viewing and editing of sent messages.

"My Time Capsule" displays messages received from others. Both past (open) and future (locked) messages are displayed in this view with various sorting, filtering, forward and reply options being provided. There is also preferably an indicator in this menu displaying the number of unread, received messages. This page is possible to lock with a pass code.

"Time wall" displays messages posted to a public time wall. Both past (open) and future (locked) messages are displayed in this section with various sorting and filtering options.

At the Main Menu, the user can access their settings (upper left corner) that include, but are not limited, to profile information and image, contact information, notification information, options to connect to other networks (Facebook, Twitter, etc.), options for viewing lists of followers, and other general settings.

The Main Menu, in this embodiment, features a button to access the user notification center where the user can view all notifications received from the system. The user can click on a notification to view the content and message for which a notification has been sent.

FIG. 2A and FIG. 2B

Add, Edit, or Delete Profiles:

Before posting future accessible messages, one or more profiles need to be added to the network, if profiles do not already exist for the person to which a post will be directed. The user can create family profiles by clicking on plus signs that open up a profile information page.

The user is only required to fill in information that is available at the current time which means that a profile for unborn family members can be added.

The user can edit (or update) a profile at any time to add information such as name, birthdate, wedding date, contact information, etc. Each profile has an on/off button for notifications.

Profiles may be updated on a regular basis through email reminders to the family members.

FIG. 3A, FIG. 3B, and FIG. 3C

Add family profiles and future generations:

A user can add unborn family members for as many generations forward (i.e., future generations) as they like.

As soon as profiles are created, the user can select one or more family members by clicking the profile. By double clicking on a profile, the user can post directly to a specific profile.

When a profile is selected, the user will be provided with the option to post into the future of the selected profile(s) or edit information or delete the profile.

Figure 4A:
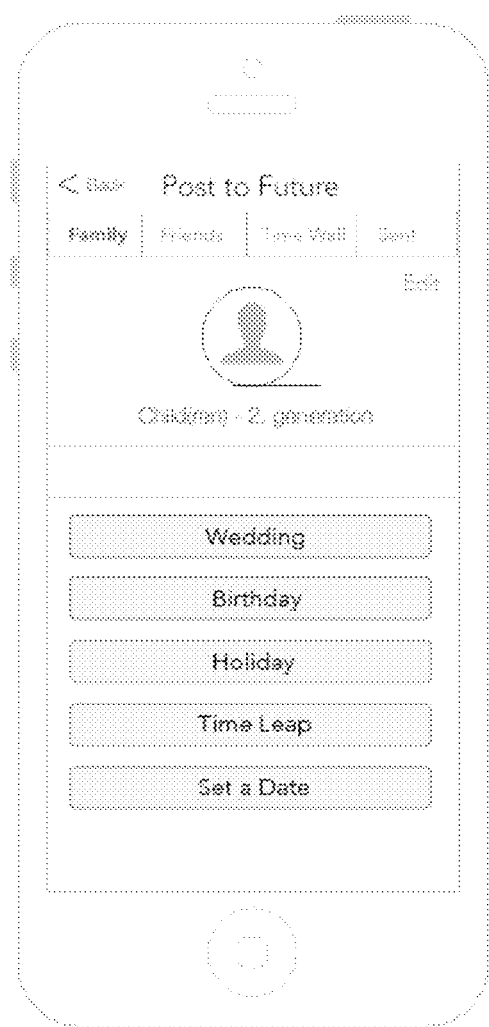
FIG. 4A illustrates another embodiment of a graphical user interface page or screen, useful for using the herein described networks, in accordance with one embodiment of the subject invention.
Figure 4B:
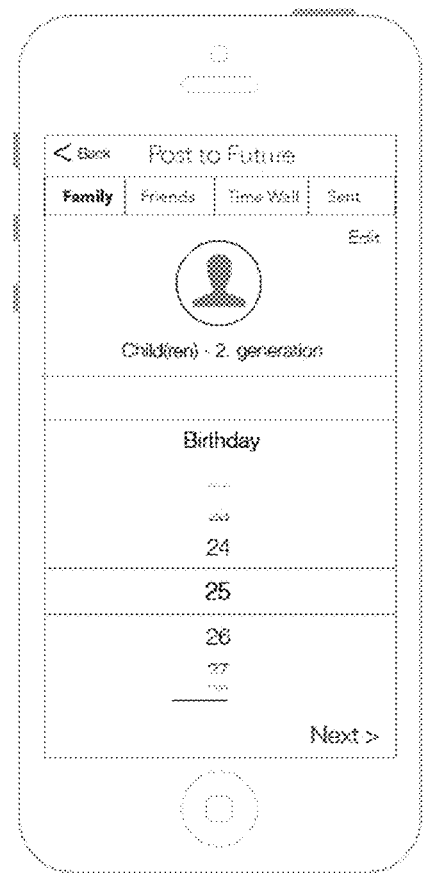
FIG. 4B illustrates another embodiment of a graphical user interface page or screen, useful for using the herein described networks, in accordance with one embodiment of the subject invention.
Figure 4C:
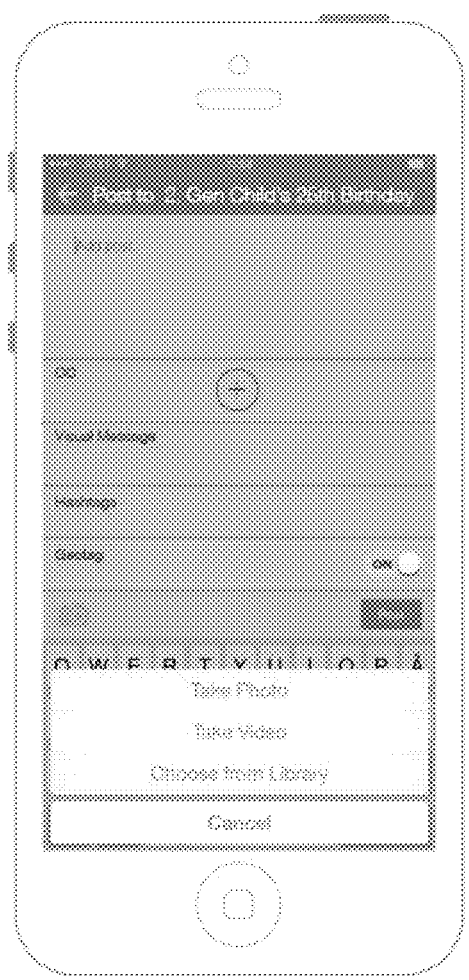
FIG. 4C illustrates another embodiment of a graphical user interface page or screen, useful for using the herein described networks, in accordance with one embodiment of the subject invention.

FIG. 4A, FIG. 4B, and FIG. 4C

Post to a Family Profile:

As soon as a family profile is created, a user can select the family profile and post into the profile's future life moments such as (but not limited to) wedding day and wedding anniversaries, birthdays, holidays, etc., or use the time leap function, or simply post to a future arbitrary date. If the user chooses to post to more than one profile, the birthday and wedding posting option will disappear.

A user can post any media "to the future" including but not limited to videos, images, text, photographs, virtual reality content, sound, or any other media type.

Created posts can be cc-ed (copied) to other family members, geo tagged, hash tagged and a user can optionally add a visible text to the post (text which is visible prior to the message being unlocked).

FIG. 5

Post to Friend's Profile:

A user can add and edit friends profiles on this page. Friends are displayed as a list that will be sortable (newest, alphabetically, etc.) and searchable (e.g., by name).

The system can be connected to other social networks or contact lists so that a user can quickly add friends to the system.

As soon as a friend's profile is created, the user can post to a friend's future events with similar options as the family profiles.

Created posts can be cc-ed (copied) to other family members, geo tagged, hash tagged, and a user can optionally add a visible text to the post (text which is visible prior to the message being unlocked).

FIG. 6A, FIG. 6B, and FIG. 6C

Post to Time Wall:

In this screen, a user can post into the future on a time wall. The time wall is an open public wall.

A user can post future moments or events holidays, or use the time leap function, or simply post to a future arbitrary date.

A user can post any media "to the future" including but not limited to videos, images, text, photographs, virtual reality content, sound, or any other media type.

Created posts can be cc-ed (copied) to other family members, geo tagged, hash tagged and a user can optionally add a visible text to the post (text which is visible prior to the message being unlocked).

FIG. 7

Sent Menu:

Under the Sent menu on the displayed screen, the user can view and scroll through all messages sent by the user and edit or delete them.

Preferably, only messages that have not been unlocked can be deleted.

Unlocked messages will be displayed with a count down timer.

The user can sort the list in accordance with various variables such as name, event, date sent, or access count-down time.

Figure 8A:
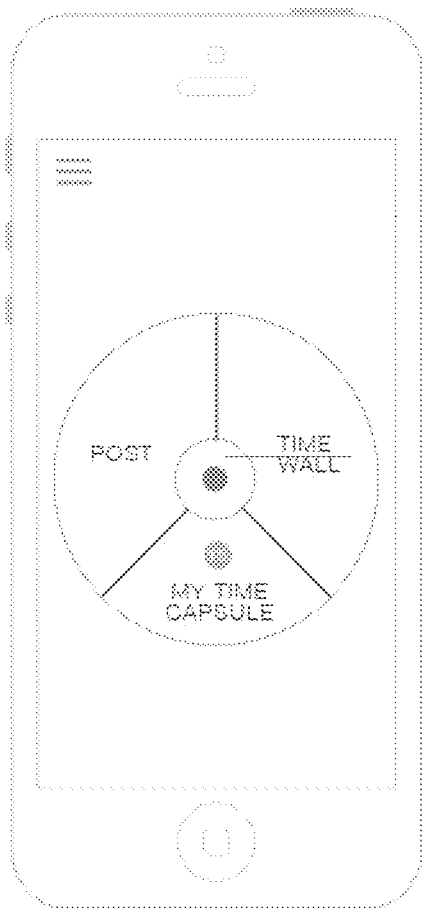
FIG. 8A illustrates another embodiment of a graphical user interface page or screen, useful for using the herein described networks, in accordance with one embodiment of the subject invention.
Figure 8B:
FIG. 8B illustrates another embodiment of a graphical user interface page or screen, useful for using the herein described networks, in accordance with one embodiment of the subject invention.

FIG. 8A and FIG. 8B

Time Wall:

This screen shown in the figure is a Time Wall which is a public wall where anyone can post into the future.

In this example, the wall is divided into Past (unlocked posts) and Future (posts that are still locked).

Each post shows who posted it, when it was posted, when it was unlocked and may optionally include a visible message associated with the post. If the post is open/unlocked, it will display a thumbnail (preview image) of the posted content.

The Time Wall is searchable using various variables including keyword, name, geo tag, etc. and can be sorted in accordance with various variables including, but not limited to, Most Popular, Open Soon, Recently added, My Favorites, etc.

A user can "follow" any person that is on the Time Wall by clicking the heart to get notifications about this persons posts to the Time Wall.

The user can access posts located on the Time Wall directly from the Time Wall itself.

FIG. 9A, FIG. 9B, FIG. 9C

My Capsule:

The My Time Capsule menu indicates how many messages you have received and if any of the messages have been unlocked. This menu, in the example shown, includes the option to be secured by a pass code (e.g., numerical code, fingerprint authentication, voice recognition, or similar authentication system).

The messages inside My Time Capsule are messages received directly by the user.

My Time Capsule is divided into past (unlocked messages) and future (locked) messages.

The future messages show information about the sender, when the message is sent, when it will unlock, and optionally a visual message about the post (if the sender has chosen to write an open message). Additionally, future posts include a timer which displays the count down to the unlocking event.

Past messages are unlocked and the content is open for the user view as desired. When viewing content, the user has the option to reply to the sender, forward the post to others, share the post with social media, or delete or favorite the post.

Messages are preferably searchable using criteria such as hashtags, geotags, name, event, etc.

Figure 10A:
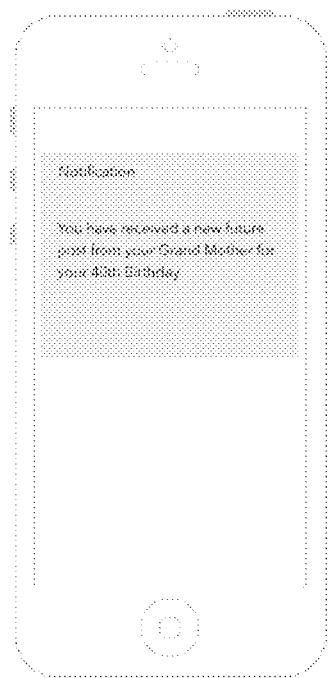
Figure 10B:
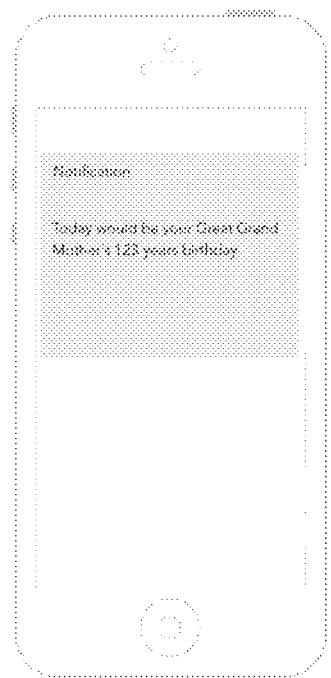
Figure 10C:
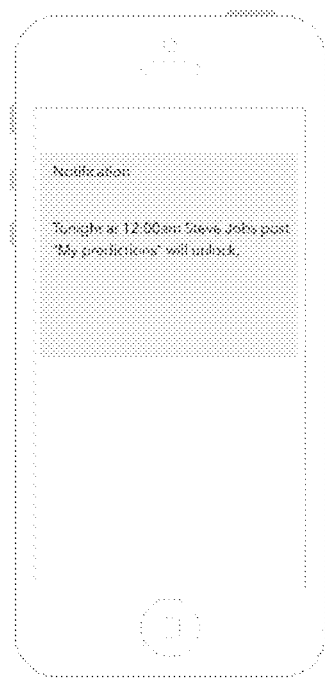
Figures 10D, 10E, 10F:

FIG. 10A, FIG. 10B, and FIG. 10C

Notifications:

The system automatically notifies a user via push messages, email, or other similar technologies. For example, a user will receive a notification when a relevant message is posted, when a message is due to be unlocked (whether personal or being followed on the time wall).

A user may also get notified or queried if a profile (e.g., of a family member or friend) is missing crucial information to deliver a message (e.g., contact information) or to update a birth date, wedding date, or similar information.

Each profile has its own notification setting for the particular user. If a user chooses to receive notifications about a specific profile, the user will receive a notification each time that profile has a life event, such as a birthday, a wedding day, etc.

Geo Tagged Notifications:

The system includes the option to notify a user based on a geo tag. The geo tag notification can be activated in the settings menu for both family and friends and for the Time Wall.

If a user is getting close to a tagged location with the family and friends setting activated, the user will get a notification pertaining to any geo tagged posts associated with that location (e.g., a notification that his/her Great Grand father was at the location 123 years ago with a link to posted content or messages).

Similarly, if the Time Wall geo tag notification is activated, the user will get a notification if there are existing posts pertaining to the visited location (along with a link or invitation to view messages or content).

Summary Description of Example Screen Functions (Embodiment 2)

In a second embodiment of the invention, alternative GUI screens or pages are provided, described below in conjunction with FIGS. 11-27, for using the herein described networks.

Main Menu

Users are provided with 5 options to navigate the network in the main menu, represented by the following selectable buttons: Home, Timewall, Post, Activity, and Profile.

Home Menu: this button, when selected, displays a feed of received from other users and events that the user is following. Both past (open) and future (locked) messages are displayed in this section with various sorting and filtering options. Home Menu has a time line that follows the scroll of the feed. The user can tap on the timeline to move back and forward in time instead of scrolling through events. The GUI is configured so that timeline will automatically zoom in on a selected time if a user holds his/her finger on the timeline.

Time wall: this button, when selected, displays messages posted to a public time wall. Both past (open) and future (locked) messages are displayed in this section with various sorting and filtering options. The user can sort, filter, and discover events on the Timewall and elect to follow them. Each event has a social component for comments and "likes" and similar features, and a user can share the events to friends and other platforms. The Timewall has a time line that follows the scroll of the feed back or forward in time. The user can tap on the timeline to move back and forward in time instead of scrolling through events. The GUI is configured so that timeline will automatically zoom in on a selected time if a user holds his/her finger on the timeline.

Post: this button, when selected, allows for the creation of and editing of profiles, posting of content and information to a profile's future, and posting of content and information to a public time wall at specific future events or time.

Activity: this button, when selected, lists upcoming and received events and notifications so that the user can quickly access the events with various action options.

Profile: this button, when selected, includes options to edit a user's profile and also includes an inbox for messages, a display of sent messages, an event calendar, a following and follower's list, and settings for control of notifications and other general settings.

FIG. 11

Post Menu—Family:

On this page, users have three main posting options: Family, Friends and Timewall.

On this page, a user can build up a family tree by adding family profiles. As soon as a profile is created, the user can tap on the profile to create a future event for that specific profile. If the user selects more than one profile from the family tree, these will be on carbon copy or send list for the event and therefore they will receive the event in their home menu and inbox when the vent is created.

A user can edit profiles by tapping on the edit profile option, which will enable the user to go in and add or update information of the profile. The user can zoom in on a profile by tapping the zoom option. The family tree will then display the family tree related to the selected profile instead of the user's profile.

The Family Menu can be displayed as family tree or list and the user can tap search to find any profile within the system.

FIG. 12

Create Profile:

On this screen, a user can create new family profiles by clicking on plus signs that open up an "add profile" page depicted in FIG. 12.

The user is only required to fill in information that is available at the current time which means that a profile for unborn family members can be added.

The user can edit (or update) a profile at any timer to add information such as name, birthdate, wedding date, contact information, etc. Each profile has an on/off button for notifications.

Profiles may be updated on regular basis through email (or similar) reminders to the family members.

FIG. 13

Build Up Family Tree, Add Family Profiles and Future Generations:

A user can add unborn family members for as many generations forward (i.e., future generations) as they like.

As soon as profiles are created, the user can select one or more family members by clicking the profile.

When a profile is selected, the user will be provided with the option to post into the future of the selected profile(s).

The system will crosscheck profiles with the system database, or with other connected social networks or contact lists and automatically update profile if update information is available.

FIG. 14

Create Events and Post to Selected Family Profile:

As soon as a family profile is created, the user can select this family profile and post into the profiles future. The first selected recipient is considered the main receiver of the event. If the user selects to post to more than one profile, the additional profiles will be carbon copied on the message or post.

FIG. 15

Select Type of Event:

In this screen, a user is provided with an option to post to specific life events associated with the selected main profile (receiving the post).

Examples of life events used in this embodiment are wedding related events, birthdays, holidays, and graduations. Alternatively, the time leap function may be selected or a user may simply post to a future arbitrary date.

At any time the user can add more recipients to the post.

FIG. 16

In this screen, when an event is selected, a popup screen will give the user the option to scroll or insert the specific time or life event when the post will unlock to reveal the messages or content in the post.

FIG. 17

In this screen, a user can post any media "to the future" including but not limited to videos, images, text, photographs, virtual reality content, sound, or any other media type. A user can also go live at a specific event to share a "live stream" to the recipients. In another option, a user can add a geo tag that will display a map with the location for an event.

The user can also choose to add a visual message or content for display in connection with the event, while the main (hidden) content remains locked until the access event occurs in the future.

FIG. 18

Home Menu:

As shown in this screen, when an event has been created, the recipients will receive the event in their Home feed and their inbox.

Each event includes information about the creator, the main recipient, and a timer that counts down to when the event unlocks.

Each event, in this example screen, utilizes a social media component with likes, share features, and the option to add comments.

The home menu has a zoomable timeline that gives a network user an option to move quickly back and forth in time and to zoom in on events.

This menu screen is provided in this example with the option to be secured by a pass code, fingerprint authentication, voice recognition, or similar authentication system.

FIG. 19

As depicted in this figure, recipients that are on a carbon copy list or which receive the event via a shared link have the option to post directly into the event.

Every message posted to the event will be unlocked for the recipients when the event unlocks.

FIG. 20

As represented in this figure, there is a social network option offered with each event, making it possible for users to comment, like, and share under each event, even before the event has been unlocked.

FIG. 21

As depicted in this figure showing a network screen, when an access event count down has gone to zero, the event changes to an UNLOCK status. Once the status changes to UNLOCK, the content may be viewed by recipients by tapping on the radio button to unlock the event and see the posts or content associated with the event.

The unlocked posts can be scrolled inside the event or viewed separately, and the users viewing the event can comment and like the posts. On personal posts (as opposed to public Timewall posts), the recipients can reply to a received message inside the event.

FIG. 22

In the screen shown in this figure, users can import and add friends to a friends list. Moreover, by tapping on the friend's profile, the user can select a main recipient and several co-recipients.

FIG. 23

In this screen, a user can create a future event and post into the future of one or more friends.

The user can choose to display visual media and text on the post notification or facing which is visible even before the event unlocks.

In this example screen, special posting options will be offered as a premium service to add special features to the event such as buy, bid, or waiting list options or to create "invite only" type options.

FIG. 24

In this screen, the user can choose to post to a public Timewall. The posting options are Holidays, Time Leap, and Set a Date.

FIG. 25

As shown in this screen, Timewall posts are displayed on the Timewall menu. The timewall menu, in this example, includes a zoomable timeline just like the home menu.

In this screen, users can explore, sort, and filter events.

Also in this screen, any user can choose to follow the event in order to receive notifications when the event unlocks or, optionally, if the creator creates more events.

There is a social network capability provided with each event including the option to submit likes and comments. Events can also be shared through a share link sent via email and via other media or social platforms.

Timewall messages, in this example, are also searchable using criteria such as hashtags, geo tags, creator name, event name, etc.

FIG. 26

On this screen depicted in the figure, an activity page is provided which is a list of notifications that a user receives or follows.

Action buttons are also provided to take the user directly to the event and the associated activity.

FIG. 27

In this screen, the profile menu contains an inbox for direct messages, a sent box for sent messages, a calendar, lists of followers, and lists of events the user is following.

The inbox contains messages that have been sent to the user. The user can choose to delete messages or hide a message/profile that they would like to revisit at a later stage in time (e.g., if a profile user has deceased and the user feels that it is too early to view a message or content generated by the deceased user).

The sent menu contain all messages that a user has sent to others. The user can choose to delete a message that is sent to the future if the message has not been unlocked (i.e., because the access event has not yet occurred).

The calendar provided contains suggestions for upcoming events that the user can post to and/or future events that the user has received or is following.

In this screen, a user can tap on an event to go directly to the event to post to it or to view an existing event.

When the "Following" button is selected, a list of all profiles that the user is following (or that are on a family or friends list) is displayed. An option is also provided to block a contact.

The Setting menu function contains general settings such as notification settings.

Notifications:

The system automatically notifies a user via push messages, email, or other similar technologies. For example, a user will receive a notification when a relevant message is posted, when a message is due to be unlocked (whether personal or being followed on the time wall).

A user may also get notified or queried if a profile (e.g., of a family member or friend) is missing crucial information to deliver a message (e.g., contact information) or to update of a birth date, wedding date, or similar information.

Each profile has its own notification setting for the particular user. If a user chooses to receive notifications about a specific profile, the user will receive a notification each time that profile has a life event, such as a birthday, a wedding day, etc.

Geo Tagged Notifications:

The system includes the option to notify a user based on a geo tag. The geo tag notification can be activated in the settings menu for both family and friends and for the Time Wall.

If a user is getting close to a tagged location with the family and friends setting activated, the user will get a notification pertaining to any geo tagged posts associated with that location (e.g., a notification that his/her Great Grand father was at the location 123 years ago with a link to posted content or messages).

Similarly, if the Time Wall geo tag notification is activated, the user will get a notification if there are existing posts pertaining to the visited location (along with a link or invitation to view messages or content).

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined:

We claim:

1. A method comprising:

providing a network to which a plurality of interactive devices are communicably connected;

providing a graphical user interface which is visible to users of said network on viewing screens of said plurality of interactive devices;

at least one content originating user of one of said plurality of interactive devices creating content comprised of multimedia subject matter, and uploading said content to said network, wherein said content upload is visible as a post notification on said network to select viewing users of said interactive devices communicably connected to said network; said content originating user of said one of said plurality of interactive devices, which uploaded said content to said network, also selecting an access event for associating with said content visible as said post notification; said access event being an event for which no date has been defined at the time of said content upload;

wherein said multimedia subject matter comprising said content is inaccessible to said select viewing users of said interactive devices prior to occurrence of said access event; and wherein said multimedia subject matter comprising said content is automatically unlocked for access by said select viewing users of said interactive devices upon occurrence of said access event;

providing a verification feature in said network configured to verify the existence or occurrence of said access event for which no date has been defined at the time of said content upload, said verification feature being so configured wherein the occurrence of said access event must be validated by at least one other user of said system to ensure content is unlocked only upon a genuine occurrence of said access event;

at least a second content originating user creating and uploading to said network at least a second scope of content and associating a geo tag with said second scope of content; unlocking access to said geo tagged content when a selected network user or users travels proximal to a geographic location affiliated with said geo tag generated by said at least second content originating user, wherein said second scope of content may be viewed by said selected network user or users;

detecting a geographic location of one of said plurality of interactive devices being used by at least a third content originating user and thereafter accessing a database of access events tailored to said detected geographic location and associated culture, and said one of said plurality of interactive devices thereafter supplying a menu of geographically and/or culturally tailored access events for selection by said at least third content originating user; said at least third content originating user selecting at least one geographically and/or culturally tailored access event and creating a third scope of content, comprised of multimedia subject matter, and uploading said third scope of content to said network, wherein said third scope of content upload is visible as a post notification on said network to select viewing users of said interactive devices communicably connected to said network; and said multimedia subject matter generated by said at least third content originating user being inaccessible to said select viewing users of said interactive devices prior to occurrence of said at least one geographically and/or culturally tailored access event; and wherein said multimedia subject matter generated by said at least third content originating user is unlocked for access by said select viewing users of said interactive devices upon occurrence of said at least one geographically and/or culturally tailored access event.

2. The method according to claim 1 further comprising the method steps of:

creating a network profile for a person which is unborn;

selecting a said access event associated with said unborn person and posting content associated with said access event.

3. The method according to claim 1 further comprising the method steps of:

creating a network profile for a person which is presently alive and post birth;

selecting a said access event associated with said alive, post birth person and posting content associated with said access event.

4. The method according to claim 1 further comprising the method steps of:

additional network users uploading additional content to said network and associating said additional content with said post notification;

unlocking access to said additional content upon occurrence of said access event at a time which corresponds with said temporal data.

5. The method according to claim 2 further comprising the method steps of:

additional network users uploading additional content to said network and associating said additional content with said post notification;

unlocking access to said additional content upon occurrence of said access event at a time which corresponds with said temporal data.

6. The method according to claim 3 further comprising the method steps of:

additional network users uploading additional content to said network and associating said additional content with said post notification;

unlocking access to said additional content upon occurrence of said access event at a time which corresponds with said temporal data.

* * * * *